(12) United States Patent
Wang et al.

(10) Patent No.: US 10,036,677 B2
(45) Date of Patent: Jul. 31, 2018

(54) METHOD FOR ANALYZING STRESS IN AN OBJECT

(71) Applicant: National Tsing Hua University, Hsinchu (TW)

(72) Inventors: Wei-Chung Wang, Hsinchu (TW); Po-Chi Sung, Hsinchu (TW); Yu-An Chiang, Hsinchu (TW); Te-Heng Hung, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 15/653,855

(22) Filed: Jul. 19, 2017

(65) Prior Publication Data
US 2018/0024016 A1 Jan. 25, 2018

(30) Foreign Application Priority Data

Jul. 22, 2016 (TW) ............................. 105123152 A

(51) Int. Cl.
*G01L 1/24* (2006.01)
*G01B 11/16* (2006.01)
(Continued)

(52) U.S. Cl.
CPC .............. *G01L 1/241* (2013.01); *G01B 11/18* (2013.01); *G01B 11/168* (2013.01); *G06F 17/12* (2013.01);
(Continued)

(58) Field of Classification Search
CPC .................................. G01L 1/241; G01B 11/18
See application file for complete search history.

(56) References Cited

U.S. PATENT DOCUMENTS 5,400,131 A * 3/1995 Stockley ................. G01L 1/241
356/33
8,780,348 B2 * 7/2014 Wang ....................... G01L 1/24
356/33

(Continued)

FOREIGN PATENT DOCUMENTS

CN 100468044 C 3/2009
TW 201120425 A1 6/2011
TW I368024 B 7/2012

OTHER PUBLICATIONS

Taiwanese Search Report, dated Jul. 7, 2017, for Taiwanese Application No. 105123152, with an English translation.

*Primary Examiner* — Jonathan Hansen
(74) *Attorney, Agent, or Firm* — Birch, Stewart, Kolasch & Birch, LLP

(57) ABSTRACT

A method for analyzing stress in an object according to spectrum data is provided. The spectrum data is obtained from an interference fringe pattern of the object that results from performing photoelasticity. The method includes: analyzing the spectrum data to obtain three sets of intensity data related respectively to different wavelengths of light used in photoelasticity; calculating wrapped phases according to the three sets of intensity data, respectively; calculating preliminary stress values according to the wrapped phases, respectively; determining a system of stress equations according to a relation among the preliminary stress values; and calculating an estimated stress value using the system of stress equations.

22 Claims, 17 Drawing Sheets

(51) Int. Cl.
    *G06F 17/17*     (2006.01)
    *G06F 17/12*     (2006.01)
    *G06F 17/13*     (2006.01)
    *G06F 17/14*     (2006.01)

(52) U.S. Cl.
    CPC ............ *G06F 17/13* (2013.01); *G06F 17/147* (2013.01); *G06F 17/17* (2013.01)

(56) References Cited

U.S. PATENT DOCUMENTS

2004/0066503 A1   4/2004   Hubner et al.
2007/0186674 A1   8/2007   Hyodo et al.
2007/0273865 A1   11/2007  Niitsu et al.

\* cited by examiner

U.S. 10,036,677 B2

METHOD FOR ANALYZING STRESS IN AN OBJECT

CROSS-REFERENCE TO RELATED APPLICATION

This application claims priority of Taiwanese Patent Application No. 105123152, filed on Jul. 22, 2016.

FIELD

The disclosure relates to a method for analyzing stress in an object, and more particularly to a method for analyzing stress in an object with photoelasticity.

BACKGROUND

Conventional methods for analyzing stress in an object with photoelasticity involve complex computing algorithms for converting wrapped phases, which are constrained in either an interval of $(-\pi, \pi]$ or an interval of $[0, 2\pi)$, into unwrapped phases. Generally, a spatial phase unwrapping algorithm or a temporal phase unwrapping algorithm can be used to convert the wrapped phases into the unwrapped phases in the conventional methods for stress analysis. However, conversion of the wrapped phases into the unwrapped phases demands lots of computing resources and time since the algorithms involve modulo operation on the wrapped phases (e.g., $\pi$ modulo and $2\pi$ modulo). Another conventional method for stress analysis in an object is an iterative method. However, the iterative method compares spectrum data of the object with a mass of spectrum data pre-stored in a database one by one, which requires a considerable amount of time and thus reduces overall efficiency.

Furthermore, light rays used in photoelasticity to generate spectrum data for stress analysis must have different wavelengths $\lambda_1, \lambda_2, \lambda_3$. The wavelengths $\lambda_1, \lambda_2, \lambda_3$ must satisfy a specific condition $$\lambda_2 = \frac{\lambda_1 \lambda_3}{\lambda_1 + \lambda_3}, \lambda_1 > \lambda_2 > \lambda_3.$$

SUMMARY

Therefore, an object of the disclosure is to provide a method for analyzing stress in an object that can alleviate at least one of the drawbacks of the prior art.

According to the disclosure, the method for analyzing stress in the object according to spectrum data is provided. The spectrum data is obtained from an interference fringe pattern of the object that results from performing photoelasticity. The method includes the steps of:

analyzing the spectrum data to obtain three sets of intensity data that are related respectively to different wavelengths of light used in photoelasticity;

calculating three wrapped phases according to the three sets of intensity data, respectively;

calculating three preliminary stress values according to the wrapped phases, respectively, wherein each of the preliminary stress values is directly proportional to a product of a corresponding one of the wrapped phases and a linear function of a corresponding one of the wavelengths;

determining a system of stress equations according to a relation among the preliminary stress values; and calculating an estimated stress value based on the preliminary stress values using the system of stress equations.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
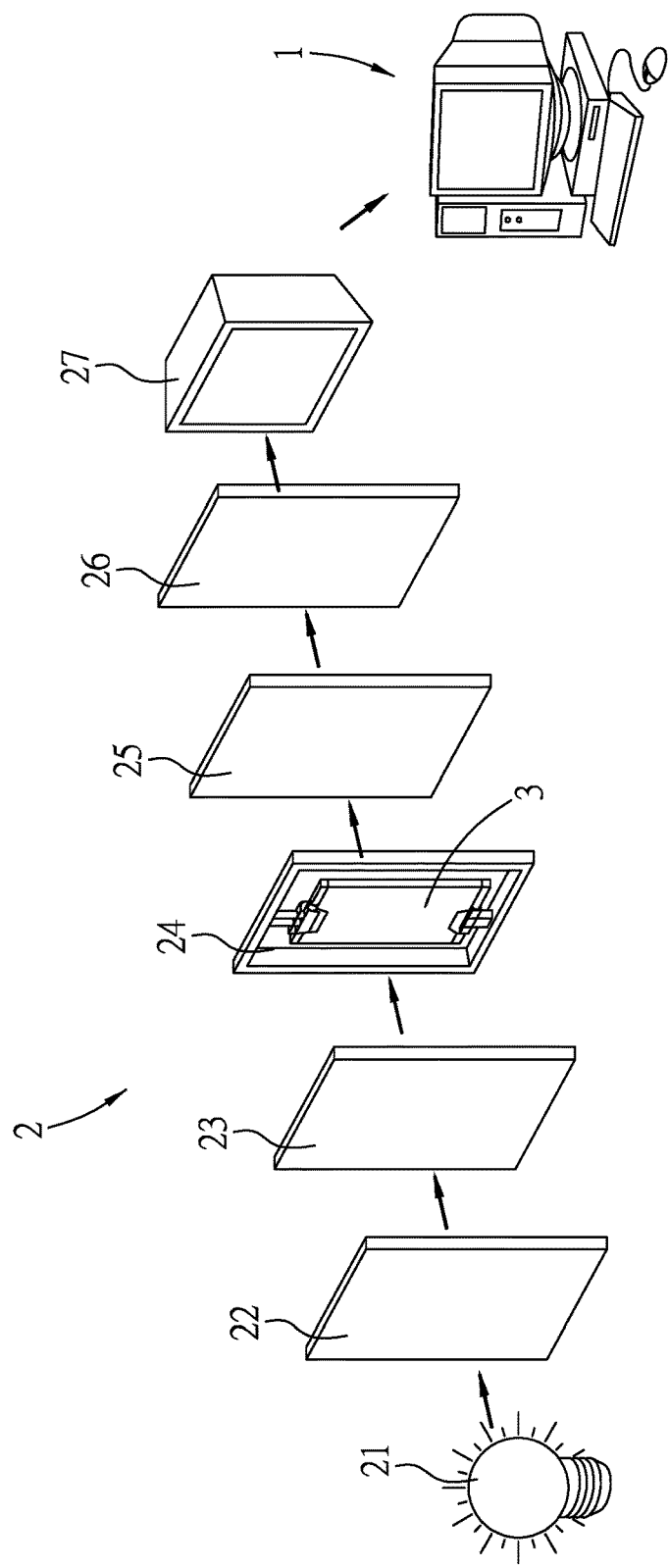
FIG. 1 is a perspective schematic view illustrating a photoelasticity measuring system according to an embodiment of this disclosure.
Figure 2:
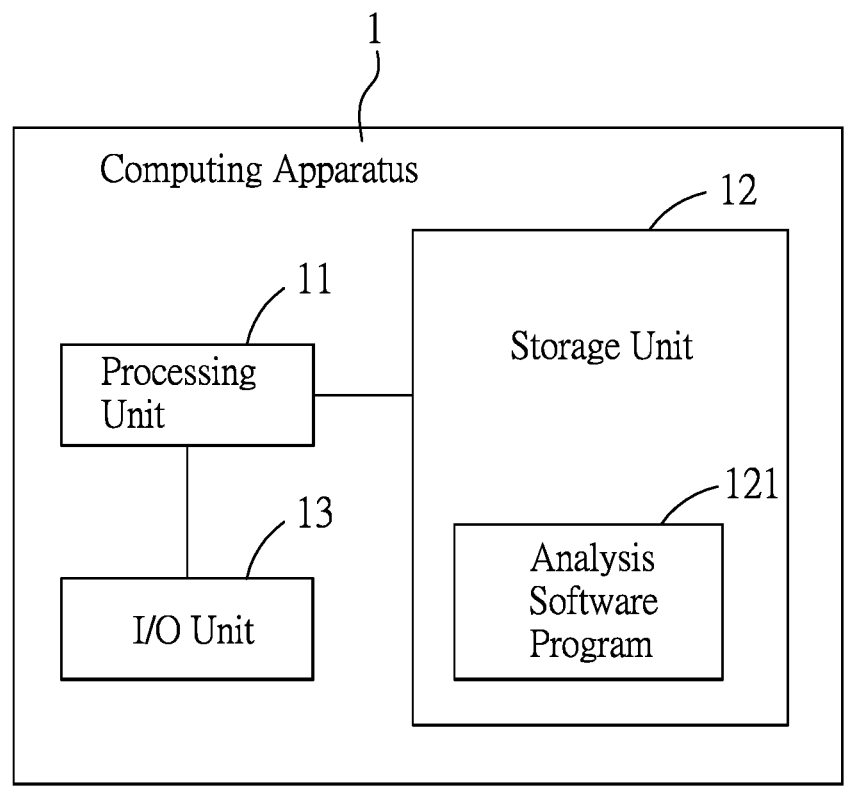
FIG. 2 is a block diagram illustrating a computing apparatus of the system of the embodiment.

Referring to FIGS. 1 and 2, a computing apparatus 1 is programmed to analyze stress in an object 3 according to spectrum data obtained by a photoelasticity measuring system 2 in accordance with an embodiment of the disclosure.

The photoelasticity measuring system 2 includes a light source 21, a first linear polarizer 22, a first quarter-wave plate 23, a holder 24, a second quarter-wave plate 25, a second linear polarizer 26 and a spectrometer 27. The holder 24 is configured to hold the object 3 and is able to apply an external force to the object 3. In this embodiment, the light source 21 is a non-monochromatic light source capable of emitting non-monochromatic light that has various wavelengths (such as a light source that emits white light), thereby facilitating user selection of three different wavelengths. In other embodiments, the light source 21 may be a quasi-monochromatic light source capable of emitting at least three different monochromatic light rays or a light ray having wavelengths within a specific range. The light rays emitted by the light source 21 pass through the first linear polarizer 22, the first quarter-wave plate 23, the object held by the holder 24, the second quarter-wave plate 25 and the second linear polarizer 26 in sequence, and generate an interference fringe pattern (IFP) due to photoelasticity.

The first linear polarizer 22 and the first quarter-wave plate 23 are used to circularly polarize the light emitted from the light source 21, and the second quarter-wave plate 25 is used to linearly polarize the light that is circularly polarized and that passes through the object 3. The second linear polarizer 26 and the optical spectrometer 27 are used together to record the spectrum data obtained from the IFP of the object 3. The spectrum data is to be sent to the computing apparatus 1 for analyzing stress in the object 3. It is should be noted that configuration of the photoelasticity measuring system 2 may be varied according to different requirements, and is not limited to this embodiment. In other embodiments, the second quarter-wave plate 25 can be removed, or both the first and second quarter-wave plates (23,25) can be removed to perform photoelasticity only with the light that is linearly polarized.

The computing apparatus 1 includes a processing unit 11, a storage unit 12 and an input/output (I/O) unit 13. The processing unit 11 is, for example, a central processing unit (CPU), and is configured to analyze the spectrum data and to control operation of the storage unit 12 and the I/O unit 13. The storage unit 12 is electrically connected to the processing unit 11, and is configured to store the spectrum data and an analysis software program 121 which, when executed by the processing unit 11, causes the processing unit 11 to perform a method for analyzing stress in the object 3. The I/O unit 13 is electrically connected to the processing unit 11, and is configured to receive the spectrum data from the photoelasticity measuring system 2 and to output an analysis result obtained by the processing unit 11 to an external device, such as a display device.

Figure 3:
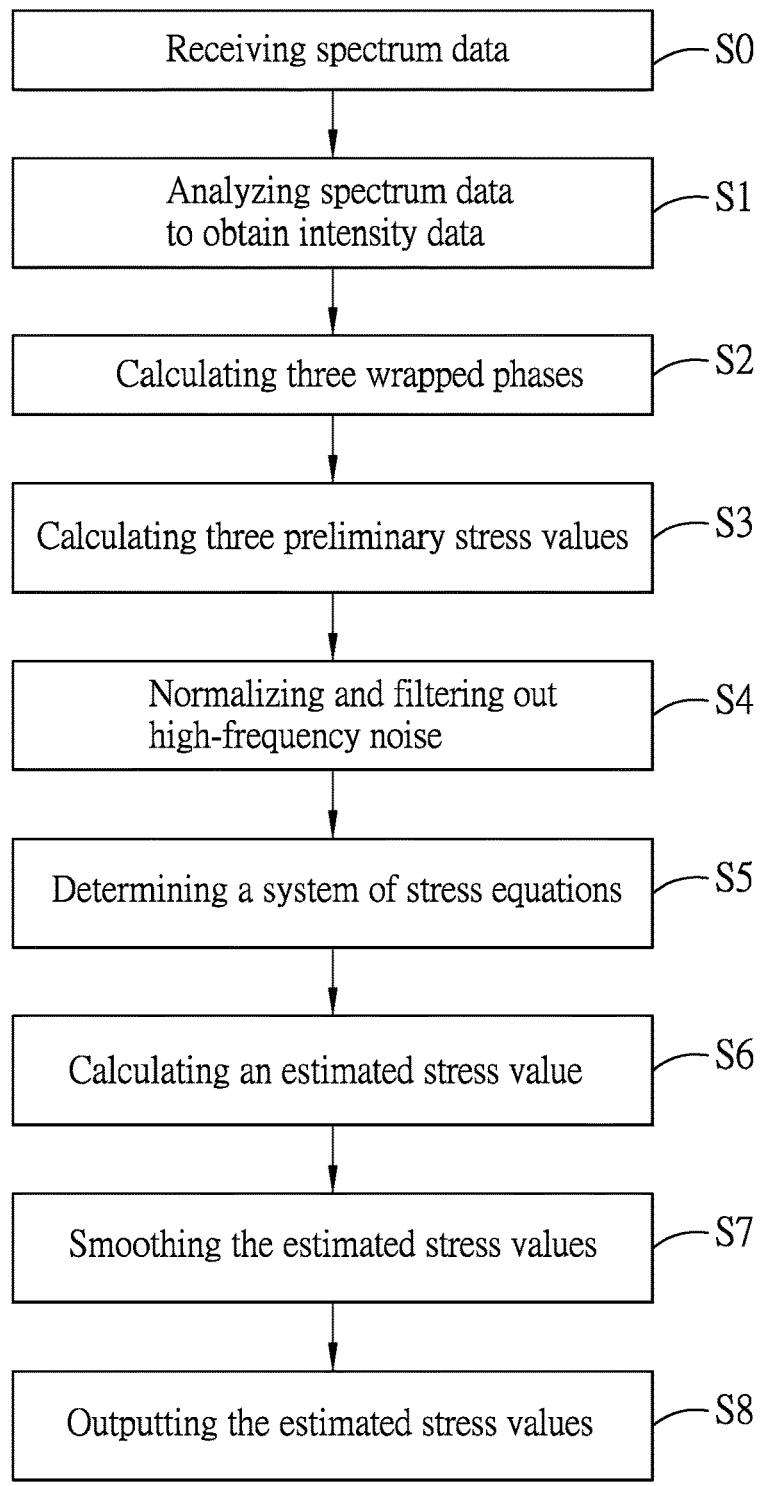
FIG. 3 is a flow chart illustrating a method for analyzing stress in an object according to an embodiment of this disclosure.

Further referring to FIG. 3, the method for analyzing stress in the object 3 includes the following steps according to an embodiment of this disclosure. It should be noted that the following description provides an exemplary implementation of the method for analyzing the stress in the object 3 at a single point, and the method can be implemented repeatedly to analyze the stress in the object 3 at every point for obtaining a stress distribution in the object 3.

Before the computing apparatus 1 implements the method for analyzing stress in the object 3, a user sets up the computing apparatus 1 and the photoelasticity measuring system 2, and places the object 3 on the holder 24. The photoelasticity measuring system 2 is operated. Accordingly, the IFP of the object 3 is generated and imaged on the spectrometer 27, and then the spectrum data is obtained.

In step S0 of the method, the I/O unit 13 receives the spectrum data from the photoelasticity measuring system 2. The spectrum data is sent to the storage unit 12, and the spectrum data is stored therein.

In step S1, the processing unit 11 analyzes the spectrum data to obtain at least three sets of intensity data that are related respectively to different wavelengths of the light emitted from the light source 21. In particular, when the analysis software program 121 is activated by the user, the processing unit 11 executes the analysis software program 121 to access the spectrum data from the storage unit 12. The user can select a first wavelength $\lambda_1$, a second wavelength $\lambda_2$ and a third wavelength $\lambda_3$ in the spectrum data, wherein the first wavelength $\lambda_1$ is the longest and the third wavelength $\lambda_3$ is the shortest (i.e., $\lambda_1 > \lambda_2 > \lambda_3$). In the method according to embodiments of this disclosure, it is unnecessary to select the three wavelengths $\lambda_1$, $\lambda_2$, $\lambda_3$, to satisfy a specific condition $$\left(\text{e.g., } \lambda_2 = \frac{\lambda_1 \lambda_3}{\lambda_1 + \lambda_3}\right).$$

After the three wavelengths $\lambda_1$, $\lambda_2$, $\lambda_3$ are selected, the processing unit 11 analyzes the spectrum data to obtain the three sets of intensity data related respectively to the first wavelength $\lambda_1$, the second wavelength $\lambda_2$ and the third wavelength $\lambda_3$.

In step S2, the processing unit 11 calculates three wrapped phases according to the three sets of intensity data, respectively. Since intensity data is a sine function of the wrapped phase, the three wrapped phases can be obtained by calculating an inverse sine function of the three sets of intensity data, respectively. It should be noted that each of the three wrapped phases calculated from the inverse sine function has a value between 0 to $\pi$, and thus, an additional modulo operation on the wrapped phases with $2\pi$ modulo is not required. It also should be noted that calculation of the wrapped phases is not limited to the inverse sine function described in this embodiment. In other embodiments, the wrapped phases can be obtained by calculating inverse cosine function and/or inverse tangent function of the three sets of intensity data, respectively.

In step S3, the processing unit 11 calculates three preliminary stress values according to the three wrapped phases, respectively. Each of the preliminary stress values is directly proportional to a product of a corresponding one of the wrapped phases and a linear function of a corresponding one of the wavelengths. More specifically, each of the preliminary stress values is obtained through the equation $$S_w = \frac{A\lambda + B}{\pi} \delta_w$$

where $S_w$ denotes the preliminary stress value, $\lambda$ denotes a corresponding one of the wavelengths, A and B are known parameters related to characteristics of material of the object 3, and $\delta_w$ denotes a corresponding one of the wrapped phases. As a result, the processing unit 11 can obtain a first preliminary stress value $S_{w\lambda_1}$ corresponding to the first wavelength $\lambda_1$, a second preliminary stress value $S_{w\lambda_2}$ corresponding to the second wavelength $\lambda_2$, and a third preliminary stress value $S_{w\lambda_3}$ corresponding to the third wavelength $\lambda_3$.

In step S4, the processing unit 11 normalizes the preliminary stress values $S_{w\lambda_1}$, $S_{w\lambda_2}$, $S_{w\lambda_3}$, and filters out high-frequency noise from the preliminary stress values $S_{w\lambda_1}$, $S_{w\lambda_2}$, $S_{w\lambda_3}$, in order to reduce errors of the preliminary stress values $S_{w\lambda_1}$, $S_{w\lambda_2}$, $S_{w\lambda_3}$ resulting from the disturbance of environment factors when interference phenomenon occurs. For example, the normalization is implemented by shifting and rescaling the preliminary stress values $S_{w\lambda_1}$, $S_{w\lambda_2}$, $S_{w\lambda_3}$ in part. The filtering process can be implemented, for example, by applying Gaussian low-pass filter in frequency domain with fast Fourier transform. However, the manners for implementing the above-mentioned numerical processing steps are not limited to this embodiment of the disclosure.

Figure 4:
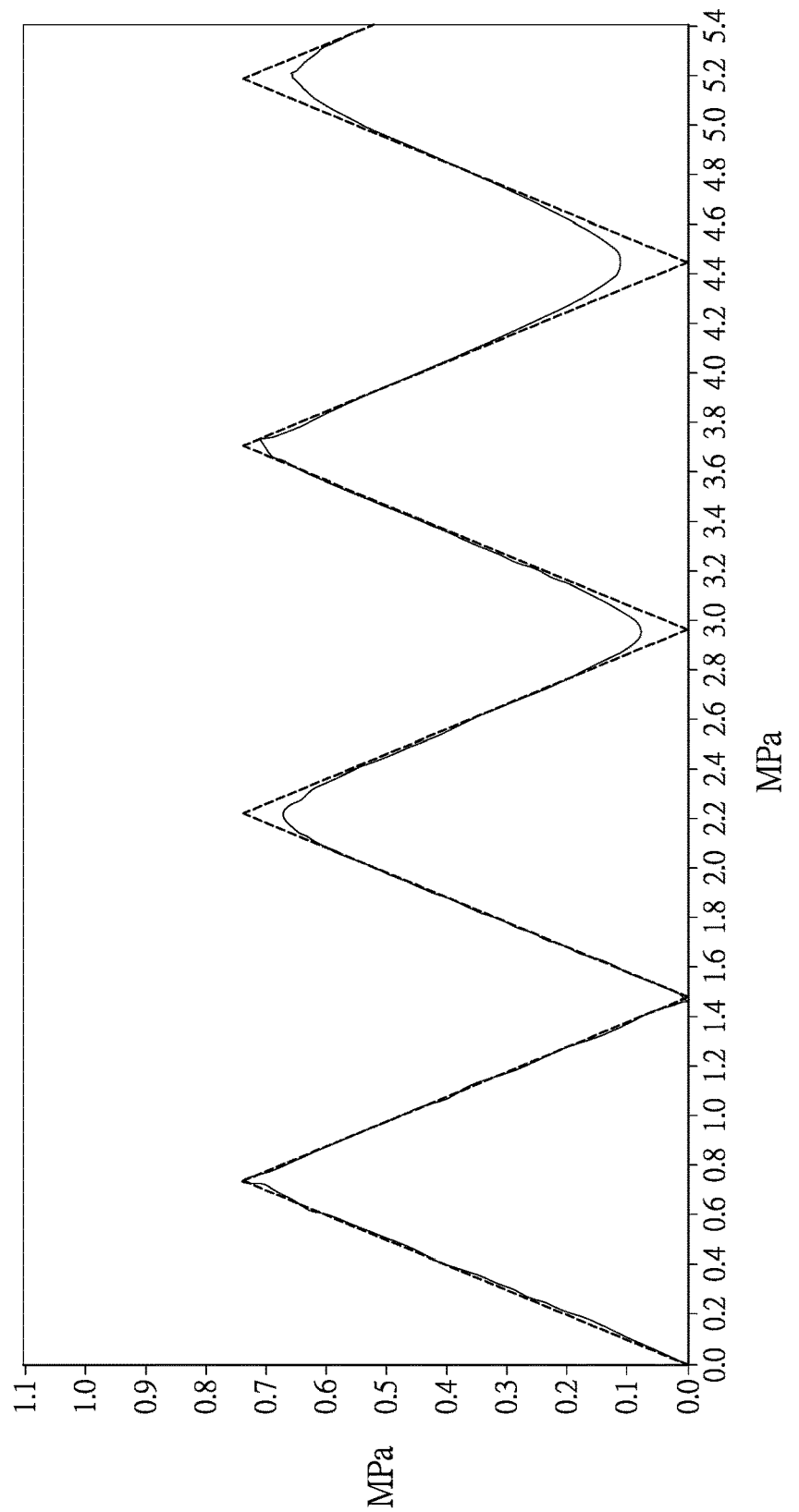
FIG. 4 shows relationship between theoretical stress values and preliminary stress values that are calculated according to wrapped phases.
Figure 5:
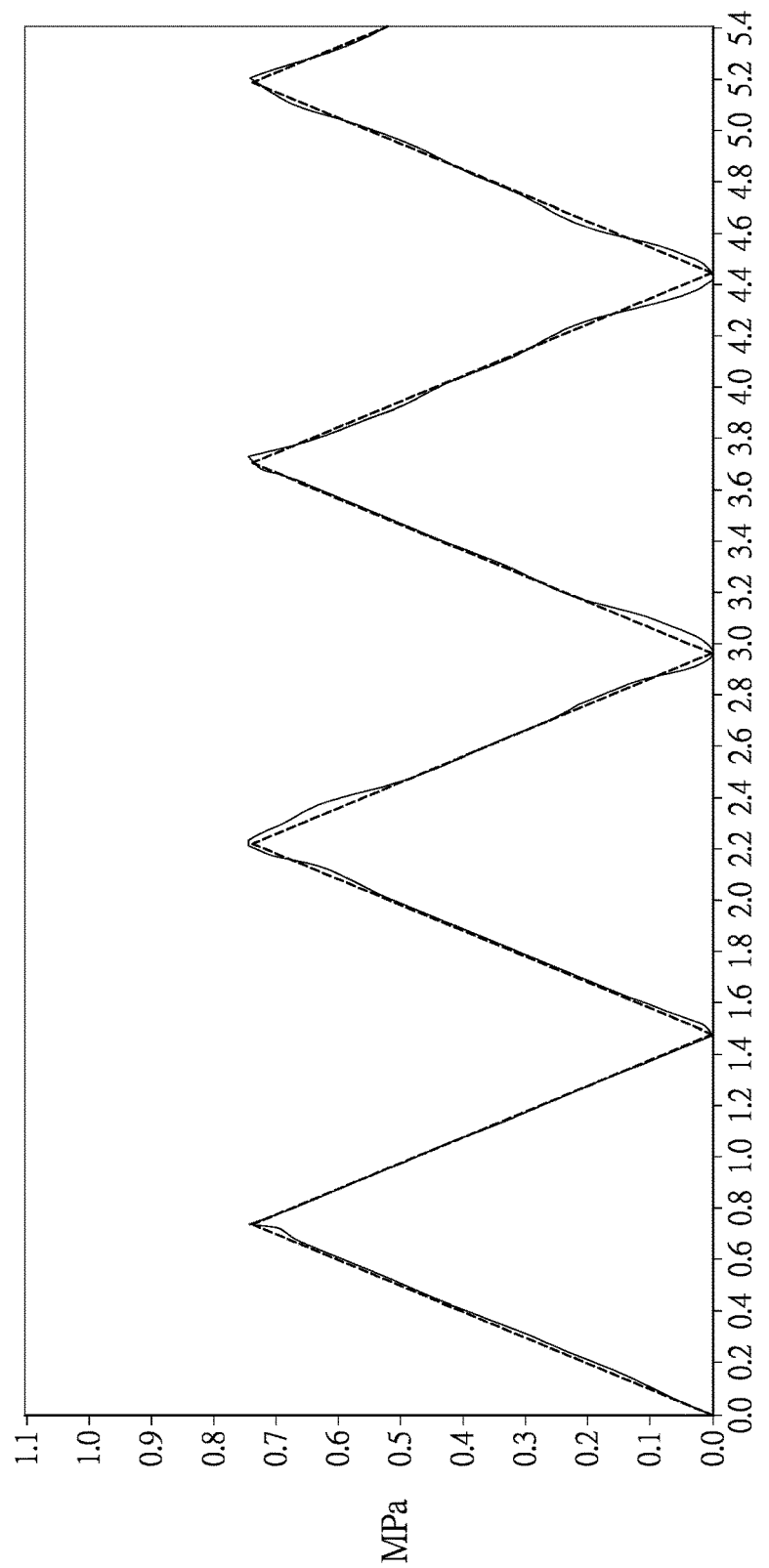
FIG. 5 shows a result of normalizing the preliminary stress values and filtering out high-frequency noise from the preliminary stress values.

The effect resulted from the step S4 is shown in FIGS. 4 and 5. In FIG. 4, the dashed line represents theoretical values of the preliminary stress values $S_w$ attributed to different external forces, and the solid line represents the experimental calculated values of the preliminary stress values $S_w$ obtained in step S3. It can be seen from FIG. 4 that the experimental calculated values (solid line) still have a certain deviation from the theoretical values (dashed line), especially for the values close to the local maximum and minimum values. After step S4 (i.e., normalization and filtering process) is implemented, the deviation of the experimental calculated values from the theoretical values is significantly reduced, as shown in FIG. 5. Therefore, by implementing step S4, the inaccuracy of the preliminary stress values $S_w$ due to the high-frequency noise and the disturbance from the environment factors during the interference phenomenon is reduced. In some embodiments, step S4 can be skipped when the preliminary stress values $S_w$ calculated in step S3 are already accurate enough.

In step S5, the processing unit 11 determines a system of stress equations according to a relation among the preliminary stress values $S_{w\lambda_1}$, $S_{w\lambda_2}$, $S_{w\lambda_3}$. In particular, the processing unit 11 selects the system of stress equations from sixteen systems of candidate equations. The principle for selecting the system of stress equations will be described in detail later.

In step S6, the processing unit 11 calculates an estimated stress value S based on the preliminary stress values $S_{w\lambda_1}$, $S_{w\lambda_2}$, $S_{w\lambda_3}$ using the system of stress equations determined in step S5.

Figure 6:
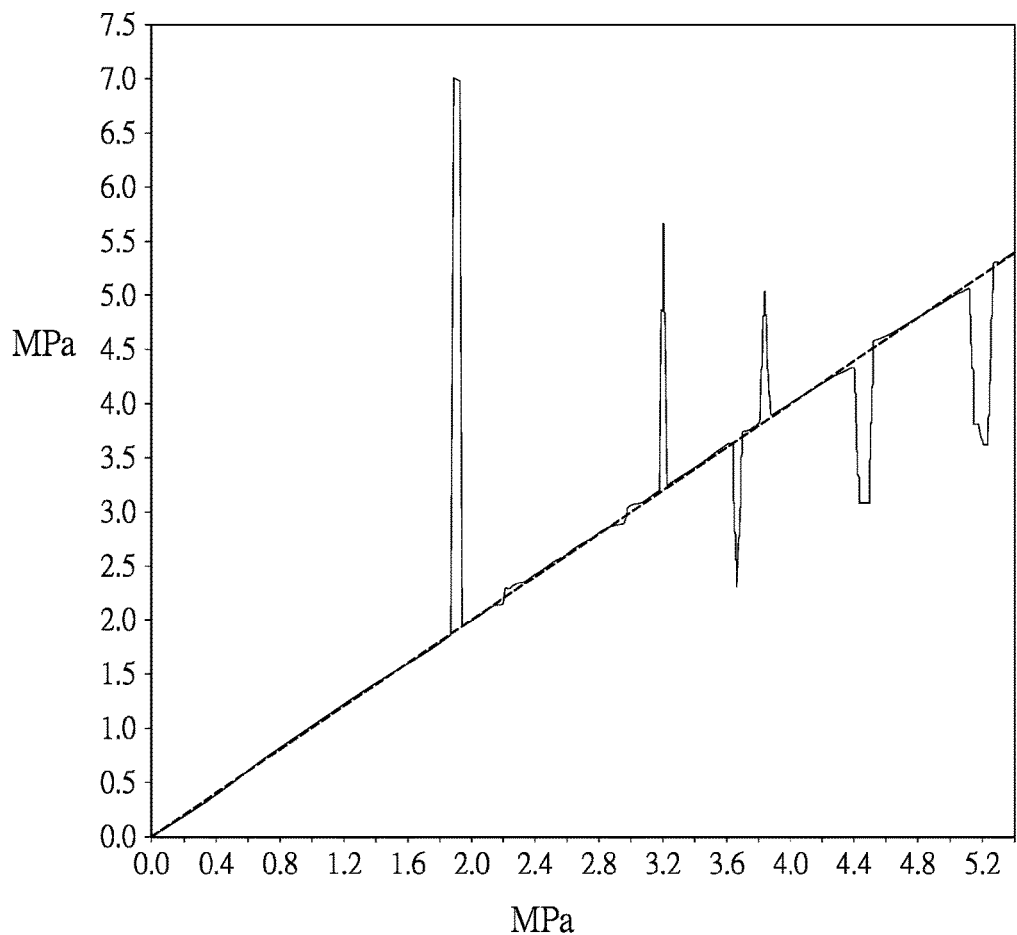
FIG. 6 shows a result of smoothing estimated stress values.

The estimated stress values S calculated in step S6 may be inaccurate due to environment disturbance and operation error. In particular, the estimated stress values S may have significant deviation and inaccurate values when the preliminary stress values $S_{w\lambda_1}$, $S_{w\lambda_2}$, $S_{w\lambda_3}$ have the local maximum and minimum values. Therefore, in step S7, the processing unit 11 smoothes the estimated stress values S in order to make the estimated stress values S more accurate. Referring to FIG. 6, the solid line represents the estimated stress values S calculated in step S6, and the dashed line represents the estimated stress values S that have been smoothed after step S7. It can be seen that the smoothing process in step S7 does filter peak values of the estimated stress values S attributed to the noises, and increase the accuracy of the estimated stress values S. In some embodiments, step S7 can be skipped when the estimated stress values S calculated in step S6 are accurate enough.

In step S8, the processing unit 11 controls the I/O unit 13 to output the estimated stress values S to a display device, a storage device, etc.

The principle for selecting the system of stress equations to be used in step S6 from the sixteen systems of candidate equations is described in the following.

The estimated stress value S can be expressed by a general equation $S=2i(A\lambda+B)\pm S_w$, where i denotes a rounding integer part of a fringe order of the IFP corresponding to the wavelength $\lambda$. By substituting one of the first wavelength $\lambda_1$, the second wavelength $\lambda_2$ and the third wavelength $\lambda_3$, and a corresponding one of the first preliminary stress value $S_{w\lambda_1}$, the second preliminary stress value $S_{w\lambda_2}$ and the third preliminary stress value $S_{w\lambda_3}$ into the general equation, a system of preliminary stress equations (P1) is obtained as the following.

$$S=2i_1(A\lambda_1+B)\pm S_{w\lambda_1}$$

$$S=2i_2(A\lambda_2+B)\pm S_{w\lambda_2}$$

$$S=2i_3(A\lambda_3+B)\pm S_{w\lambda_3} \quad (P1)$$

In the system of preliminary stress equations (P1), $i_1$, $i_2$, $i_3$ denote fringe orders corresponding to the first, second and third wavelength $\lambda_1$, $\lambda_2$, $\lambda_3$, respectively, and the parameters A, B, $\lambda_1$, $\lambda_2$, $\lambda_3$, $S_{w\lambda_1}$, $S_{w\lambda_2}$ and $S_{w\lambda_3}$ are known while the parameters S, $i_1$, $i_2$, $i_3$ and the plus-minus signs are unknown. Therefore, the estimated stress value S cannot be solved directly from the system of preliminary stress equations.

Further, the preliminary stress values $S_w$ can be converted by two conversion equations (E1) and (E2).

$$S'_w=2(A\lambda+B)-S_w \quad (E1)$$

$$S''_w=-S_w \quad (E2)$$

Based on the two conversion equations (E1) and (E2), the second preliminary stress value $S_{w\lambda_2}$ and the third preliminary stress value $S_{w\lambda_3}$ are converted into $$S'_{w\lambda_2}=2(A\lambda_2+B)-S_{w\lambda_2}$$

$$S''_{w\lambda_2}=-S_{w\lambda_2}$$

$$S'_{w\lambda_3}=2(A\lambda_3+B)-S_{w\lambda_3}$$

$$S''_{w\lambda_3}=-S_{w\lambda_3}$$

where $S'_{w\lambda_2}$ and $S''_{w\lambda_2}$ are obtained based on the second preliminary stress value $S_{w\lambda_2}$ using the two conversion equations (E1) and (E2), respectively, and $S'_{w\lambda_3}$ and $S''_{w\lambda_3}$ are obtained based on the third preliminary stress value $S_{w\lambda_3}$ using the two conversion equations (E1) and (E2), respectively.

Figure 7:
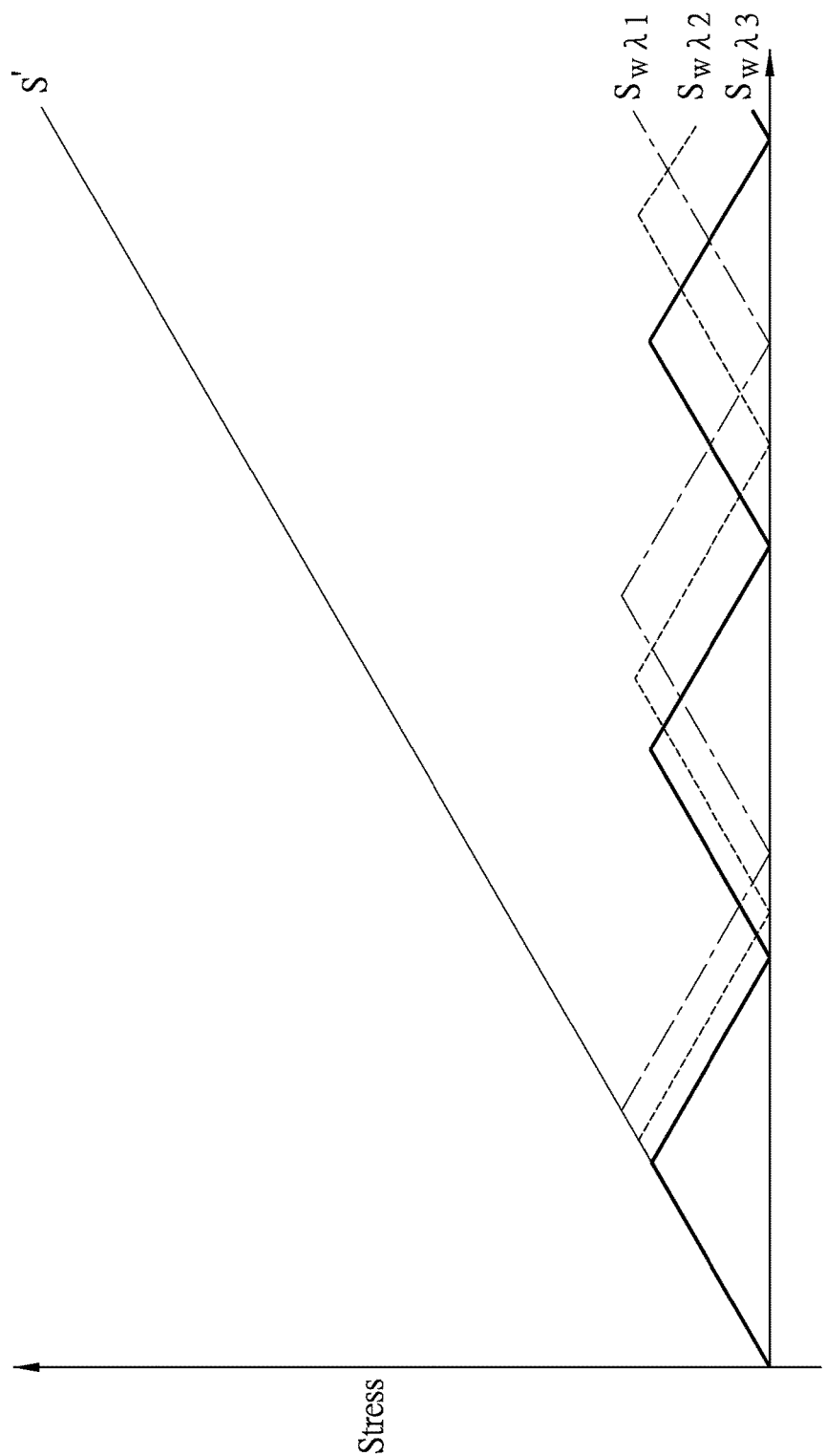
FIGS. 7 to 11 are graphs illustrating principles for determining a system of stress equations used to calculate an estimated stress value according to the preliminary stress values.
Figure 8:
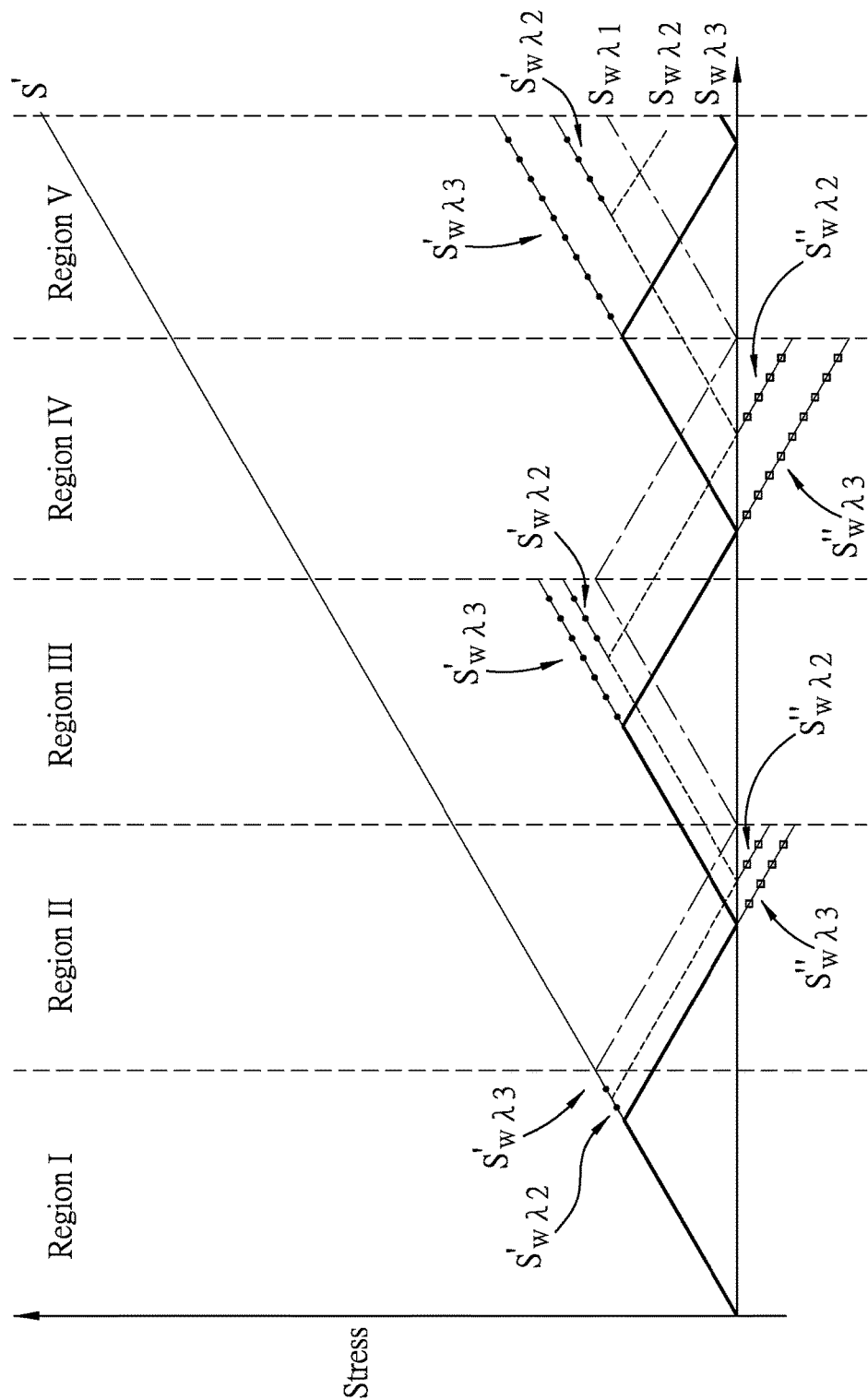

The use of the two conversion equations (E1) and (E2) are explained with reference to FIGS. 7 and 8. The graph of FIG. 7 illustrates theoretical stress values S', and the first, second and third preliminary stress values $S_{w\lambda_1}$, $S_{w\lambda_2}$ and $S_{w\lambda_3}$ under different external forces, and FIG. 8 illustrates the same graph of FIG. 7 divided into five regions (i.e., regions I to V) according to the maximum and minimum values of the first preliminary stress values $S_{w\lambda_1}$. In each of the regions I, III and V, each line segment marked with solid dots represents converted stress values $S'_{w\lambda_2}$, $S'_{w\lambda_3}$ converted from the preliminary stress values $S_{w\lambda_2}$, $S_{w\lambda_3}$ based on the conversion equation (E1), and extends in the direction of and beyond the ramp with positive slope from the local maximum value of the preliminary stress values $S_{w\lambda_2}$, $S_{w\lambda_3}$. In each of the regions II and IV, each line segment marked with hollow squares represents converted stress values $S_{w\lambda_2}$, $S_{w\lambda_3}$ converted from the preliminary stress values $S_{w\lambda_2}$, $S_{w\lambda_3}$ based on the conversion equation (E2), and extends in the direction of and beyond the ramp with negative slope from the local minimum value of the preliminary stress values $S_{w\lambda_2}$, $S_{w\lambda_3}$. Accordingly, one of the regions I to V in which the estimated stress value S lies can be determined according to the relation among the preliminary stress values $S_{w\lambda_1}$, $S_{w\lambda_2}$, $S_{w\lambda_3}$ as well as the converted stress values $S'_{w\lambda_2}$, $S_{w\lambda_3}$, $S_{w\lambda_2}$, and $S''_{w\lambda_3}$. Once the region in which the estimated stress value S lies is specified, the plus-minus sign in the system of stress equations can be determined. Further, due to using the converted stress values $S'_{w\lambda_2}$, $S'_{w\lambda_3}$, $S''_{w\lambda_2}$, and $S''_{w\lambda_3}$, the unknown and substantially complicated relation among the fringe orders $i_1$, $i_2$, $i_3$ in the system of stress equations can be simplified as $i_1=i_2=i_3$. As a result, only the fringe order $i_1$ and the estimated stress value S in the system of preliminary stress equations (P1) remain unknown, and the sixteen systems of candidate equations are derived for solving the estimated stress value S.

Referring to FIGS. 12 to 20, step S5 includes the following sub-steps for selecting the system of stress equations from the sixteen systems of candidate equations.

The relations among the first, second and third preliminary stress values $S_{w\lambda_1}$, $S_{w\lambda_2}$, $S_{w\lambda_3}$ can be categorized into four types: (1) $S_{w\lambda_1}=S_{w\lambda_2}=S_{w\lambda_3}$; (2) $S_{w\lambda_1}=S_{w\lambda_2}\neq S_{w\lambda_3}$; (3) $S_{w\lambda_1}\neq S_{w\lambda_2}=S_{w\lambda_3}$; and (4) $S_{w\lambda_1}\neq S_{w\lambda_2}$, $S_{w\lambda_2}\neq S_{w\lambda_3}$ and $S_{w\lambda_3}\neq S_{w\lambda_1}$.

Figure 12:
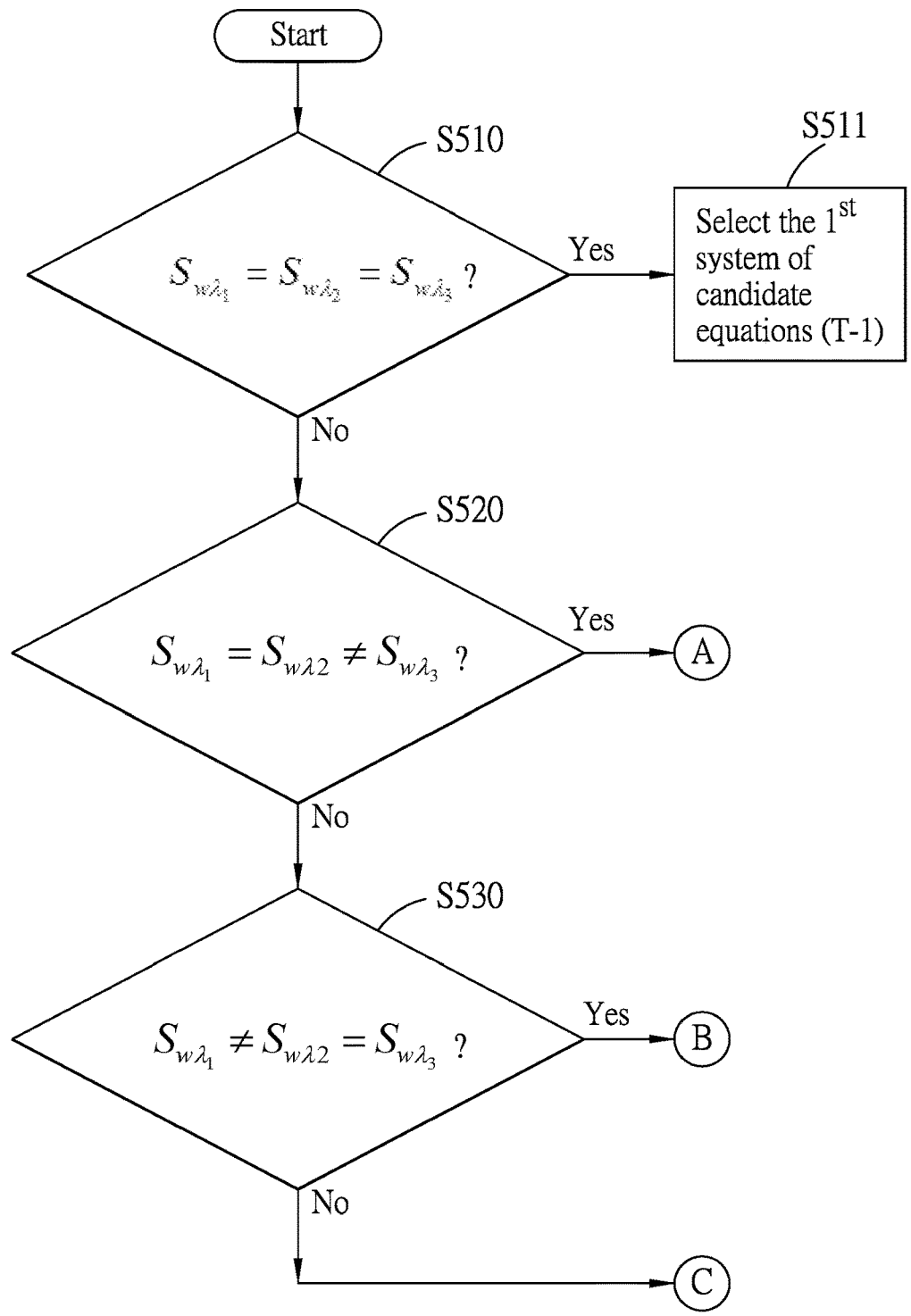
FIGS. 12 to 20 are flow charts illustrating the sub-steps of determining the system of stress equations.
Figure 13:
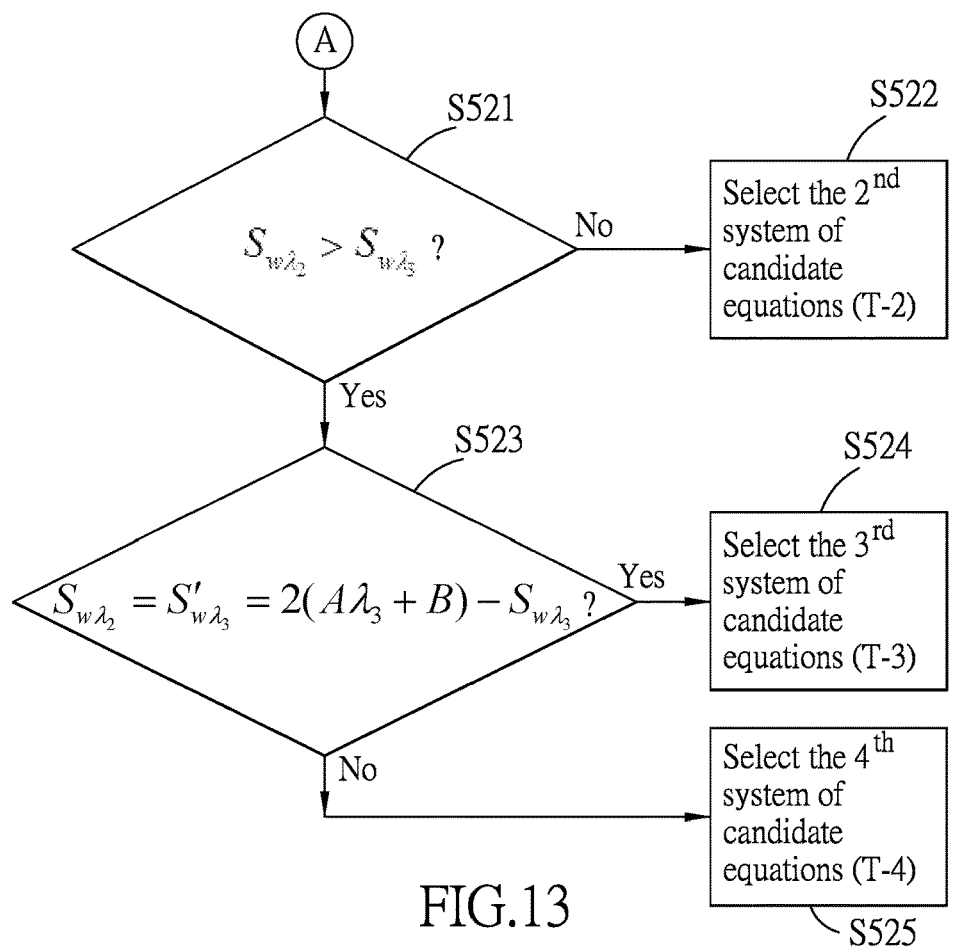
Figure 14:
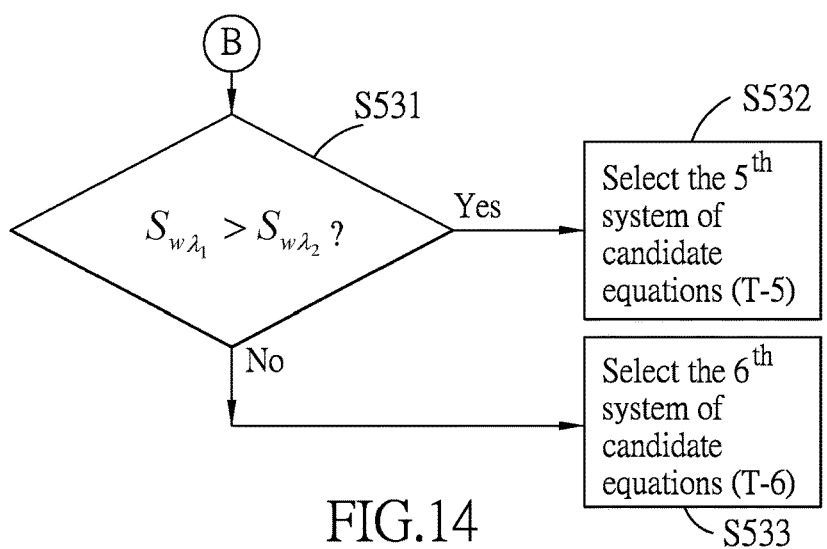

Referring to FIG. 12, in this embodiment, the processing unit 11 determines the type of the relations among the first, second and third preliminary stress values $S_{w\lambda_1}$, $S_{w\lambda_2}$, $S_{w\lambda_3}$ by executing sub-steps S510, S520 and S530 in sequence. In other embodiments, the processing unit 11 may be programmed to determine the step of the relations among the first, second and third preliminary stress values $S_{w\lambda_1}$, $S_{w\lambda_2}$, $S_{w\lambda_3}$ by only one step.

Figure 9:
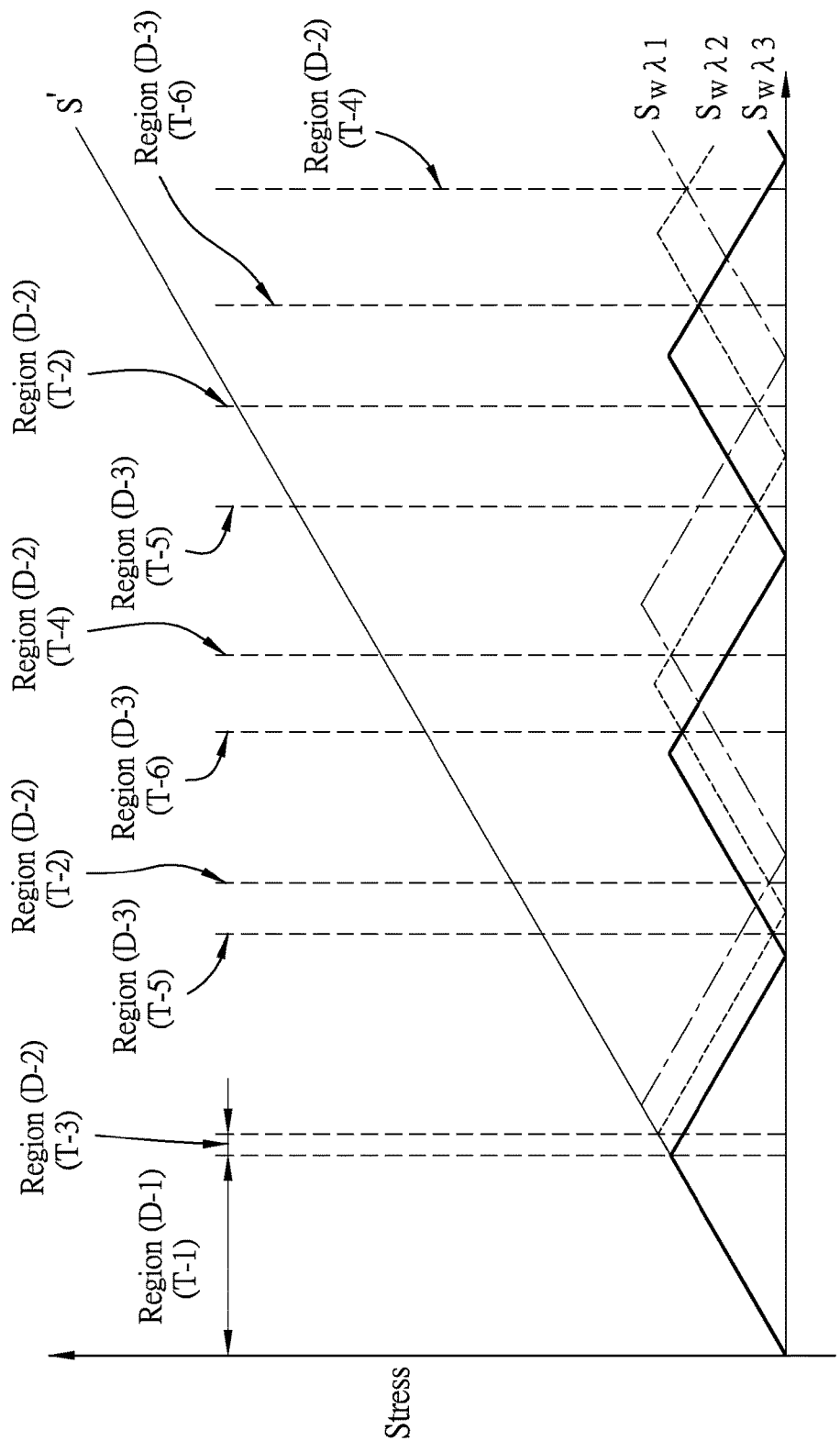

In sub-step S510, the processing unit 11 determines whether the first, second and third preliminary stress values $S_{w\lambda_1}$, $S_{w\lambda_2}$, $S_{w\lambda_3}$ are equal to one another, i.e., $S_{w\lambda_1}=S_{w\lambda_2}=S_{w\lambda_3}$. When it is determined that the preliminary stress values $S_{w\lambda_1}$, $S_{w\lambda_2}$, $S_{w\lambda_3}$ are equal to one another, it means that the estimated stress value S lies in the region (D-1) of the graph of FIG. 9. Therefore, in sub-step S511, the processing unit 11 makes the first system of candidate equations (T-1) the system of stress equations used in step S6.

$$S=2i_1(A\lambda_1+B)+S_{w\lambda_1}$$

$$S=2i_1(A\lambda_2+B)+S_{w\lambda_2}$$

$$S=2i_1(A\lambda_3+B)+S_{w\lambda_3} \quad (T-1)$$

When the determination made in the sub-step S510 is negative, it means that the preliminary stress values $S_{w\lambda_1}$, $S_{w\lambda_2}$, $S_{w\lambda_3}$, are not equal to one another, and the processing unit 11 proceeds to sub-step S520 to determine whether the relation among the preliminary stress values $S_{w\lambda_1}$, $S_{w\lambda_2}$, $S_{w\lambda_3}$ satisfies $S_{w\lambda_1}=S_{w\lambda_2}\neq S_{w\lambda_3}$. When the determination made in sub-step S520 is affirmative, it means that the estimated stress value S lies in one of the regions (D-2) of the graph of FIG. 9, and the processing unit 11 proceeds to sub-steps S521 to S525 (see FIG. 13).

In sub-step S521, the processing unit 11 further determines whether the relation between the second and third preliminary stress values $S_{w\lambda_2}$, $S_{w\lambda_3}$ satisfies $S_{w\lambda_2}>S_{w\lambda_3}$. The flow goes to sub-step S522 when the determination made in the sub-step S521 is negative, and goes to step S523 when otherwise.

In sub-step S522, the processing unit 11 makes the second system of candidate equations (T-2) the system of stress equations to be used in step S6.

$$S=2i_1(A\lambda_1+B)-S_{w\lambda_1}$$

$$S=2i_1(A\lambda_2+B)-S''_{w\lambda_2}$$

$$S=2i_1(A\lambda_3+B)-S''_{w\lambda_3} \quad (T-2)$$

In sub-step S523, the processing unit 11 further determines whether the relation between the second and third preliminary stress values $S_{w\lambda_2}$, $S_{w\lambda_3}$ satisfies $S_{w\lambda_2}=S'_{w\lambda_3}=2(A\lambda_3+B)-S_{w\lambda_3}$. The flow goes to sub-step S524 when the determination made in the step S523 is affirmative, and goes to sub-step S525 when the determination made in the step S523 is negative.

In sub-step S524, the processing unit 11 makes the third system of candidate equations (T-3) the system of stress equations to be used in step S6.

$$S=2i_1(A\lambda_1+B)+S_{w\lambda_1}$$

$$S=2i_1(A\lambda_2+B)+S_{w\lambda_2}$$

$$S=2i_1(A\ \lambda_3+B)+S'_{w\lambda_3} \quad (T-3)$$

In step S525, the processing unit 11 makes the fourth system of candidate equations (T-4) the system of stress equations to be used in step S6.

$$S=2i_1(A\lambda_1+B)+S_{w\lambda_1}$$

$$S=2i_1(A\lambda_2+B)+S'_{w\lambda_2}$$

$$S=2i_1(A\lambda_3+B)+S'_{w\lambda_3} \quad (T-4)$$

On the other hand, when the determination made in the step S520 is negative, the processing unit 11 proceeds to step S530 to further determine whether the relation among the preliminary stress values $S_{w\lambda_1}$, $S_{w\lambda_2}$, $S_{w\lambda_3}$ satisfies $S_{w\lambda_1}\neq S_{w\lambda_2}=S_{w\lambda_3}$. When the relation among the preliminary stress values $S_{w\lambda_1}$, $S_{w\lambda_2}$, $S_{w\lambda_3}$ satisfies $S_{w\lambda_1}\neq S_{w\lambda_2}=S_{w\lambda_3}$, it means that the estimated stress value S lies in one of the regions (D-3) of the graph shown in FIG. 9. Then, the processing unit 11 proceeds to sub-steps S531 to S533 (see FIG. 14).

In sub-step S531, the processing unit 11 further determines whether the relation between the first and second preliminary stress values $S_{w\lambda_1}$, $S_{w\lambda_2}$ satisfies $S_{w\lambda_1}>S_{w\lambda_2}$. The flow goes to sub-step S532 when the determination made in the sub-step S531 is affirmative, and goes to sub-step S533 when otherwise.

In sub-step S532, the processing unit 11 makes the fifth system of candidate equations (T-5) the system of stress equations to be used in step S6.

$$S=2i_1(A\lambda_1+B)-S_{w\lambda_1}$$

$$S=2i_1(A\lambda_2+B)-S_{w\lambda_2}$$

$$S=2i_1(A\lambda_3+B)+S_{w\lambda_3} \quad (T-5)$$

In sub-step S533, the processing unit 11 makes the sixth system of candidate equations (T-6) the system of stress equations to be used in step S6.

$$S=2i_1(A\lambda_1+B)+S_{w\lambda_1}$$

$$S=2i_1(A\lambda_2+B)+S_{w\lambda_2}$$

$$S=2i_1(A\lambda_3+B)+S'_{w\lambda_3} \quad (T-6)$$

Figure 15:
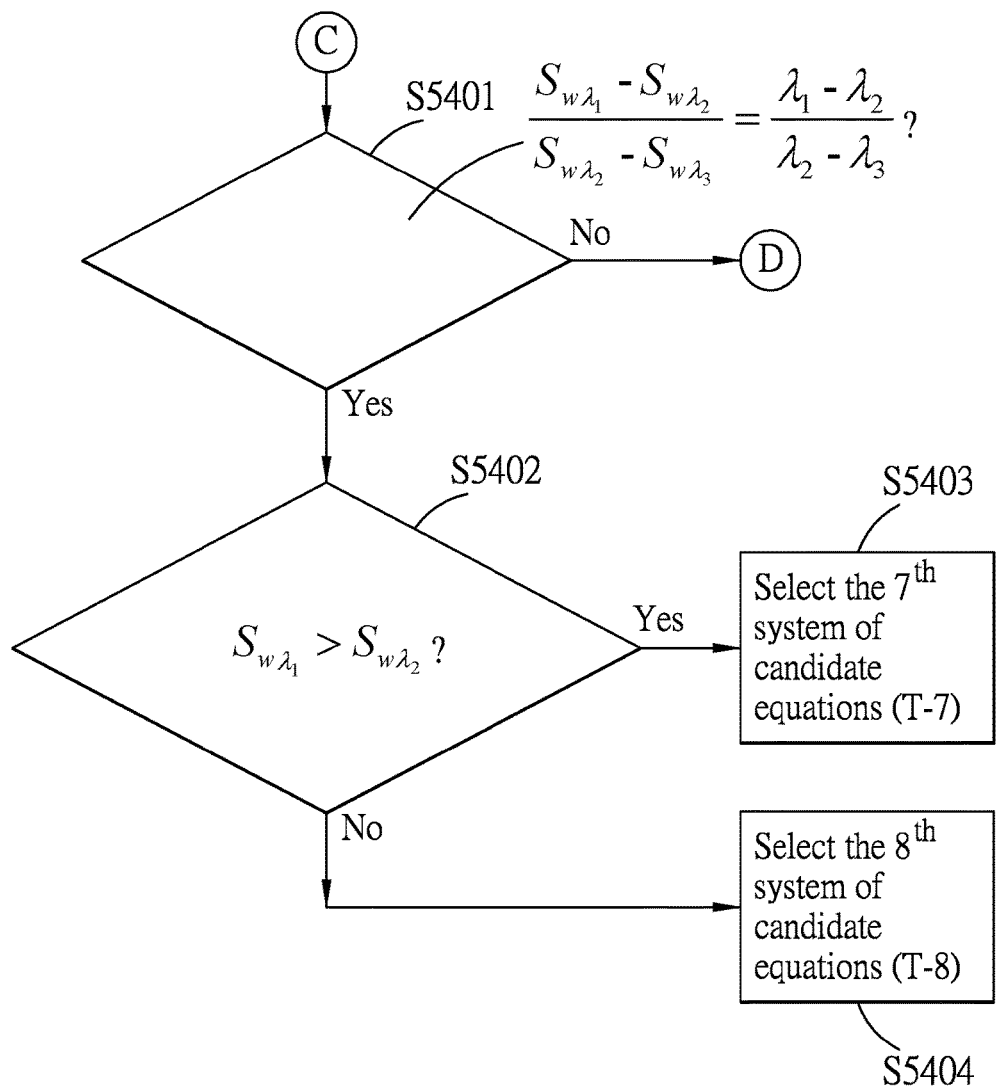
Figure 16:
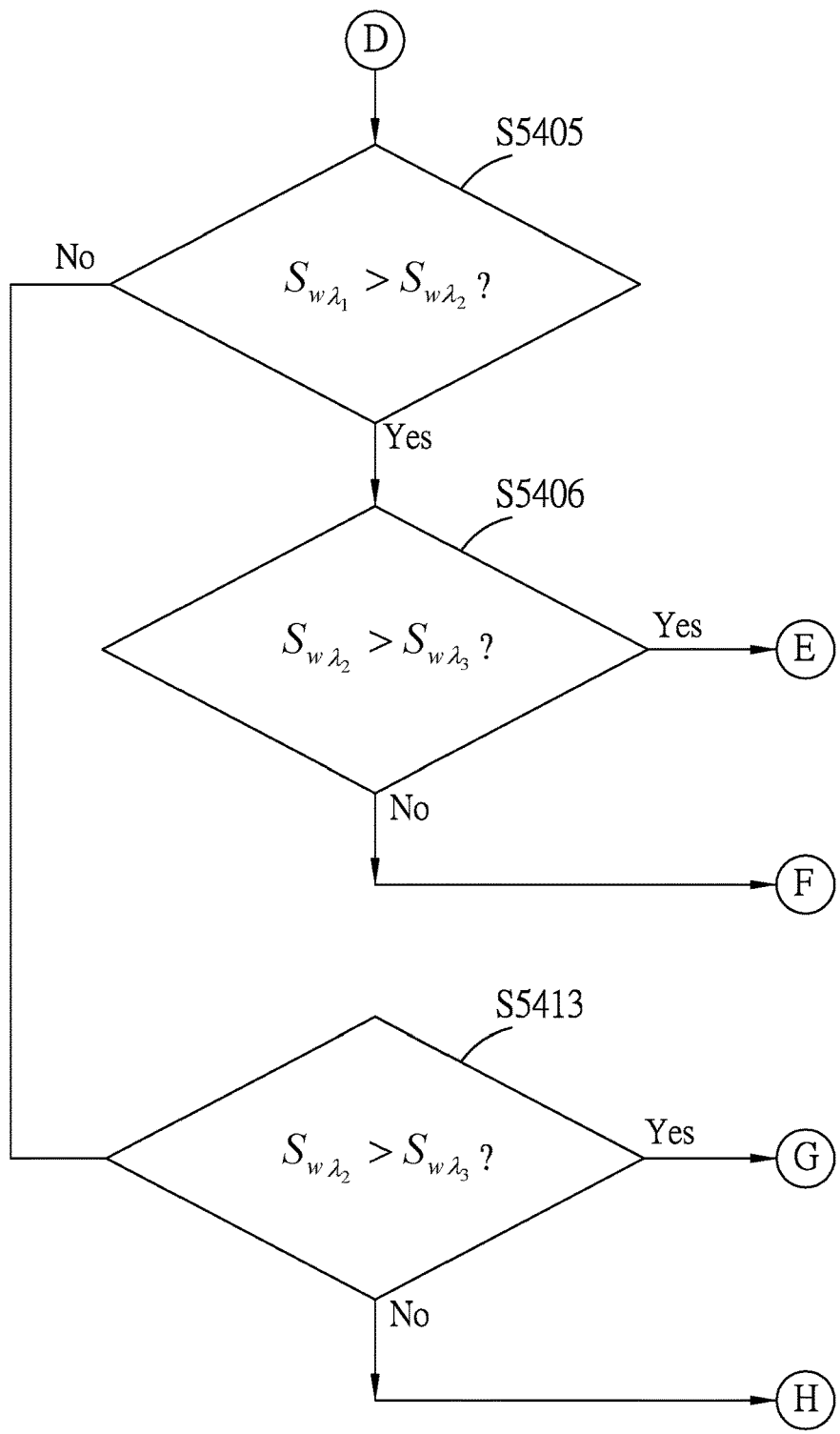
Figure 17:
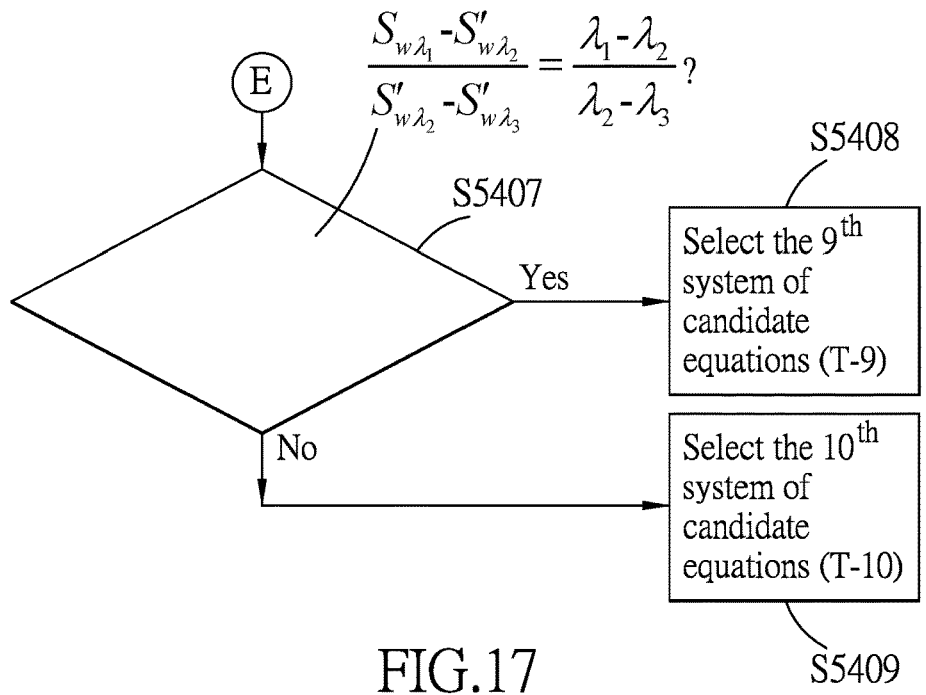

When the determination made in the step S530 is negative, it means the relation among the preliminary stress values $S_{w\lambda_1}$, $S_{w\lambda_2}$, $S_{w\lambda_3}$ satisfies $S_{w\lambda_1}\neq S_{w\lambda_2}$, $S_{w\lambda_2}\neq S_{w\lambda_3}$ and $S_{w\lambda_3}\neq S_{w\lambda_1}$ and the processing unit 11 proceeds to sub-step S5401 (see FIG. 15).

Figure 10:
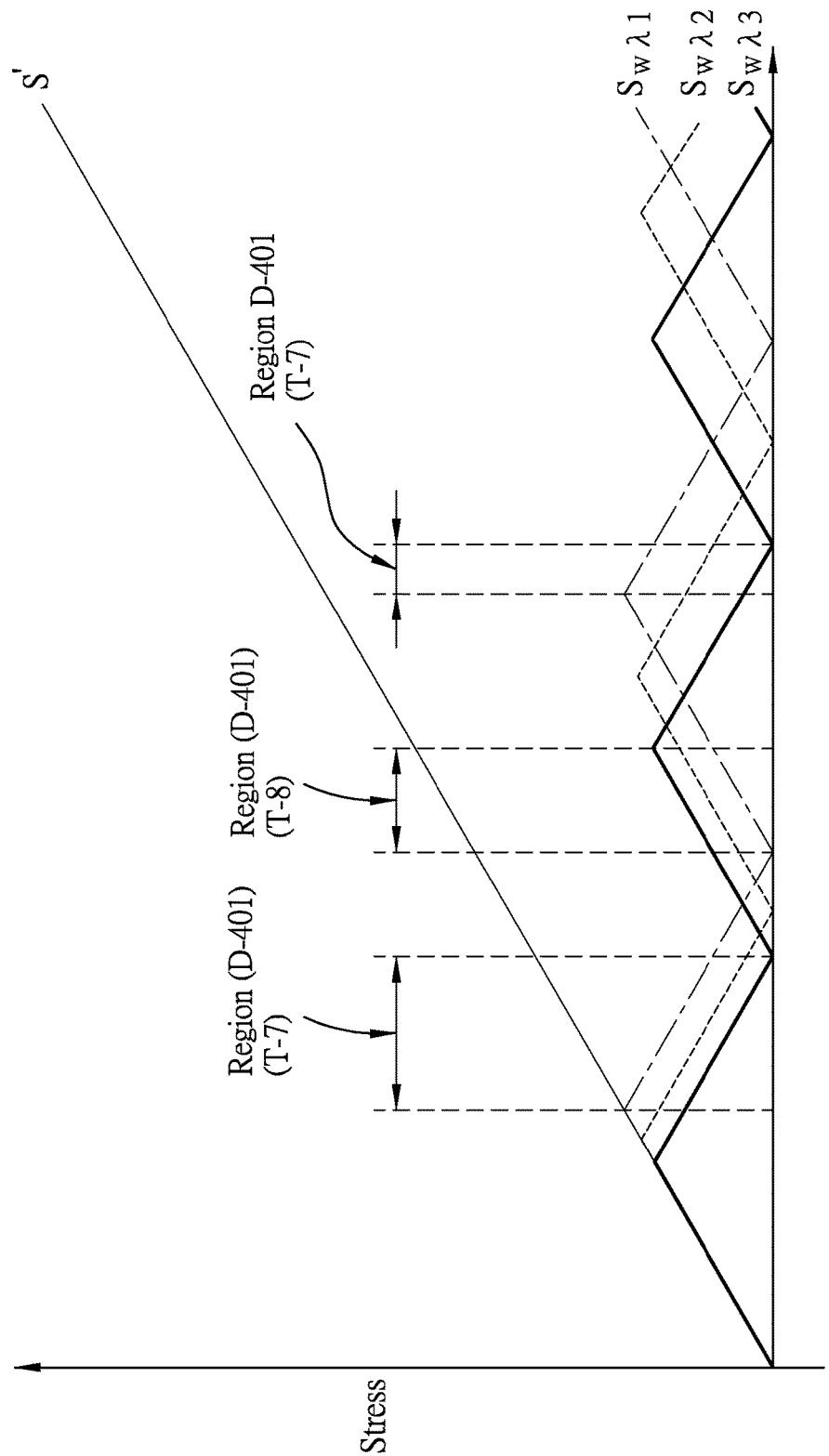

When the determination made in the sub-step S530 is negative, it means that the estimated stress value S lies in one of the regions (D-401) of the graph of FIG. 10. In order to further locate the estimated stress value S, in sub-step S5401, the processing unit 11 further determines whether the relation among the first, second and third preliminary stress values $S_{w\lambda_1}$, $S_{w\lambda_2}$, $S_{w\lambda_3}$ satisfies $$\frac{S_{w\lambda_1}-S_{w\lambda_2}}{S_{w\lambda_2}-S_{w\lambda_3}}=\frac{\lambda_1-\lambda_2}{\lambda_2-\lambda_3}.$$

When the determination made in sub-step S5401 is affirmative, the flow goes to sub-step S5402.

In step S5402, the processing unit 11 further determines whether the relation among the first preliminary stress value $S_{w\lambda_1}$ is greater than the second preliminary stress value $S_{w\lambda_2}$ (i.e., $S_{w\lambda_1}>S_{w\lambda_2}$). The flow goes to sub-step S5403 when the determination made in the sub-step S5402 is affirmative, and goes to sub-step S5404 when otherwise.

In sub-step S5403, the processing unit 11 makes the seventh system of candidate equations (T-7) the system of stress equations to be used in step S6.

$$S=2i_1(A\lambda_1+B)-S_{w\lambda_1}$$

$$S=2i_1(A\lambda_2+B)-S_{w\lambda_2}$$

$$S=2i_1(A\lambda_3+B)-S_{w\lambda_3} \quad (T-7)$$

In sub-step S5404, the processing unit 11 makes the eighth system of candidate equations (T-8) the system of stress equations to be used in step S6.

$$S = 2i_1(A\lambda_1 + B) + S_{w\lambda_1}$$

$$S = 2i_1(A\lambda_2 + B) + S_{w\lambda_2}$$

$$S = 2i_1(A\lambda_3 + B) + S_{w\lambda_3} \quad \text{(T-8)}$$

When the determination made in the sub-step S5401 is negative, the processing unit 11 proceeds to sub-step S5405 (see FIG. 16) to further determine whether the first preliminary stress value $S_{w\lambda_1}$ is greater than the second preliminary stress value $S_{w\lambda_2}$ (i.e., $S_{w\lambda_1} > S_{w\lambda_2}$). The flow goes to sub-step S5406 when the determination made in the sub-step S5402 is affirmative, and goes to sub-step S5413 when otherwise.

In sub-step S5406, the processing unit 11 further determines whether the second preliminary stress value $S_{w\lambda_2}$ is greater than the third preliminary stress value $S_{w\lambda_3}$ (i.e., $S_{w\lambda_2} > S_{w\lambda_3}$). When the determination made in sub-step S5406 is affirmative, the flow goes to sub-step S5407 (see FIG. 17).

Figure 11:
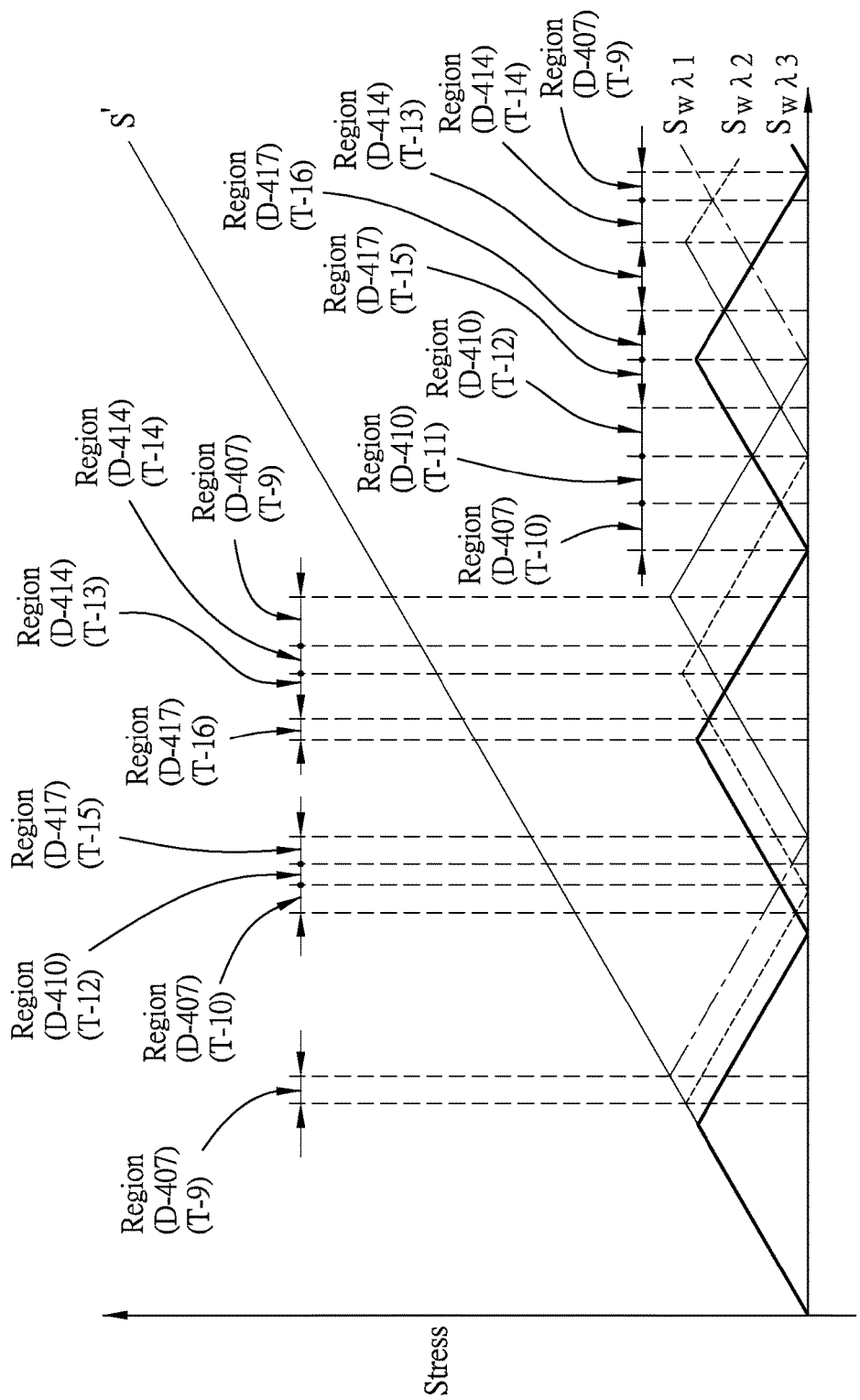

When the determination made in sub-step S5406 is affirmative, it means that the estimated stress value S lies in one of the regions (D-407) of the graph of FIG. 11. In order to further locate the estimated stress value S, in sub-step S5407, the processing unit 11 further determines whether the relation among the first, second and third preliminary stress values $S_{w\lambda_1}$, $S_{w\lambda_2}$, $S_{w\lambda_3}$ satisfies $$\frac{S_{w\lambda_1} - S'_{w\lambda_2}}{S'_{w\lambda_2} - S'_{w\lambda_3}} = \frac{\lambda_1 - \lambda_2}{\lambda_2 - \lambda_3}.$$

The flow goes to sub-step S5408 when the determination made in sub-step S5407 is affirmative, and goes to sub-step S5409 when otherwise.

In step S5408, the processing unit 11 makes the ninth system of candidate equations (T-9) the system of stress equations to be used in step S6.

$$S = 2i_1(A\lambda_1 + B) + S_{w\lambda_1}$$

$$S = 2i_1(A\lambda_2 + B) + S'_{w\lambda_2}$$

$$S = 2i_1(A\lambda_3 + B) + S'_{w\lambda_3} \quad \text{(T-9)}$$

In sub-step S5409, the processing unit 11 makes the tenth system of candidate equations (T-10) the system of stress equations to be used in step S6.

$$S = 2i_1(A\lambda_1 + B) - S_{w\lambda_1}$$

$$S = 2i_1(A\lambda_2 + B) - S_{w\lambda_2}$$

$$S = 2i_1(A\lambda_3 + B) + S_{w\lambda_3} \quad \text{(T-10)}$$

Figure 18:
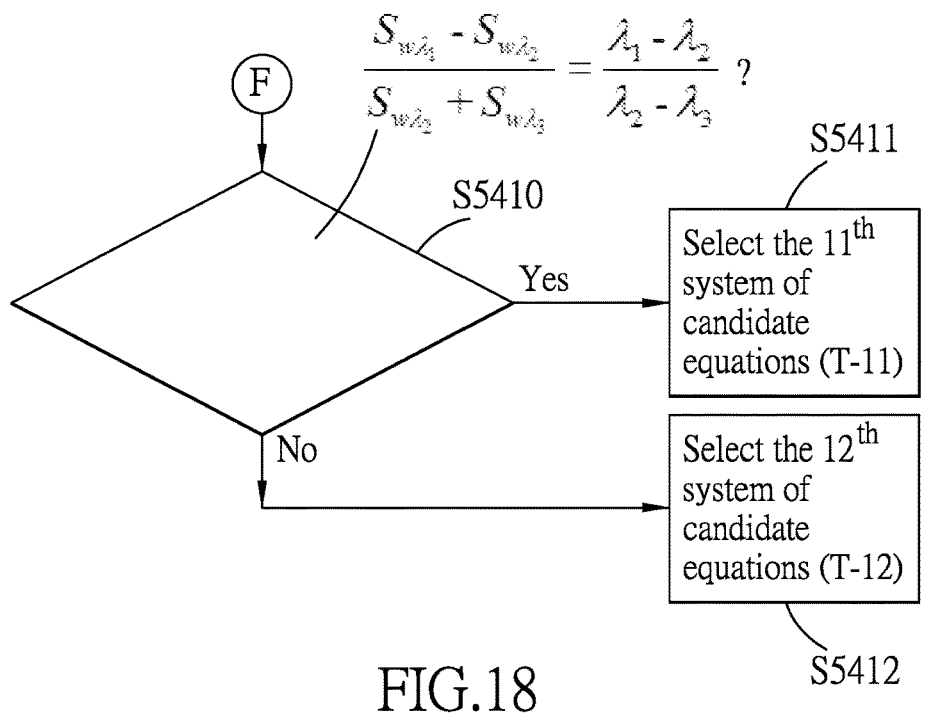
Figure 19:
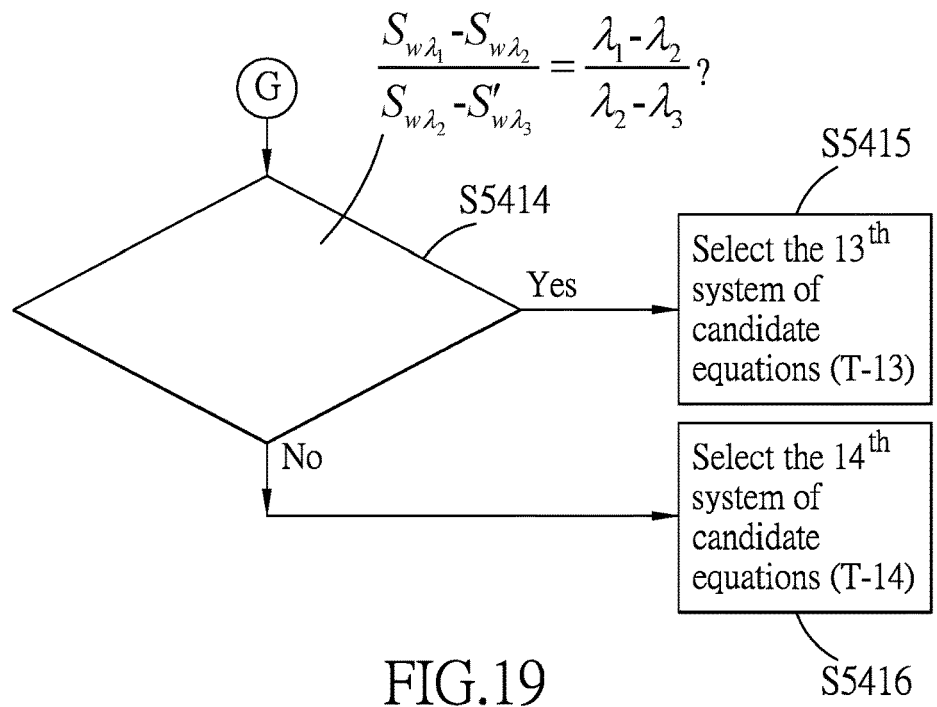
Figure 20:
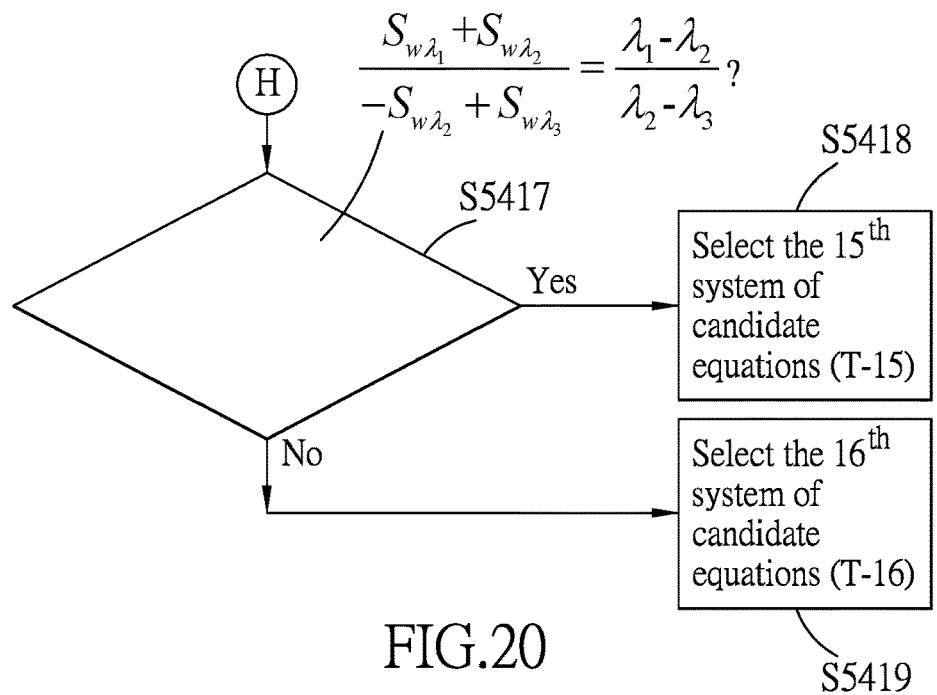

When the determination made in sub-step S5406 is negative, it means that the estimated stress value S lies in one of the regions (D-410) of the graph of FIG. 11, and the flow goes to sub-step S5410 (see FIG. 18). In sub-step S5410, the processing unit 11 further determines whether the relation among the first, second and third preliminary stress values $S_{w\lambda_1}$, $S_{w\lambda_2}$, $S_{w\lambda_3}$ satisfies $$\frac{S_{w\lambda_1} - S_{w\lambda_2}}{S_{w\lambda_2} + S_{w\lambda_3}} = \frac{\lambda_1 - \lambda_2}{\lambda_2 - \lambda_3}$$

in order to further locate the estimated stress value S. The flow goes to sub-step S5411 when the determination made in sub-step S5410 is affirmative, and goes to sub-step S5412 when otherwise.

In sub-step S5411, the processing unit 11 makes the eleventh system of candidate equations (T-11) the system of stress equations to be used in step S6.

$$S = 2i_1(A\lambda_1 + B) - S_{w\lambda_1}$$

$$S = 2i_1(A\lambda_2 + B) - S_{w\lambda_2}$$

$$S = 2i_1(A\lambda_3 + B) + S_{w\lambda_3} \quad \text{(T-11)}$$

In sub-step S5412, the processing unit 11 makes the twelfth system of candidate equations (T-12) the system of stress equations to be used in step S6.

$$S = 2i_1(A\lambda_1 + B) - S_{w\lambda_1}$$

$$S = 2i_1(A\lambda_2 + B) + S_{w\lambda_2}$$

$$S = 2i_1(A\lambda_3 + B) + S_{w\lambda_3} \quad \text{(T-12)}$$

In sub-step S5413, the processing unit 11 further determines whether the second preliminary stress value $S_{w\lambda_2}$ is greater than the third preliminary stress value $S_{w\lambda_3}$ (i.e., $S_{w\lambda_2} > S_{w\lambda_3}$).

When the determination made in sub-step S5413 is affirmative, it means that the estimated stress value S lies in one of the regions (D-414) of the graph of FIG. 11, and the processing unit 11 proceeds to sub-step S5414 (see FIG. 19) to further determine whether the relation among the first, second and third preliminary stress values $S_{w\lambda_1}$, $S_{w\lambda_2}$, $S_{w\lambda_3}$ satisfies $$\frac{S_{w\lambda_1} - S_{w\lambda_2}}{S_{w\lambda_2} - S'_{w\lambda_3}} = \frac{\lambda_1 - \lambda_2}{\lambda_2 - \lambda_3}$$

in order to further locate the estimated stress value S. The flow goes to sub-step S5415 when the determination made in sub-step S5414 is affirmative, and goes to sub-step S5416 when otherwise.

In sub-step S5415, the processing unit 11 makes the thirteenth system of candidate equations (T-13) the system of stress equations to be used in step S6.

$$S = 2i_1(A\lambda_1 + B) + S_{w\lambda_1}$$

$$S = 2i_1(A\lambda_2 + B) + S_{w\lambda_2}$$

$$S = 2i_1(A\lambda_3 + B) + S'_{w\lambda_3} \quad \text{(T-13)}$$

In sub-step S5416, the processing unit 11 makes the fourteenth system of candidate equations (T-14) the system of stress equations to be used in step S6.

$$S = 2i_1(A\lambda_1 + B) + S_{w\lambda_1}$$

$$S = 2i_1(A\lambda_2 + B) + S'_{w\lambda_2}$$

$$S = 2i_1(A\lambda_3 + B) + S'_{w\lambda_3} \quad \text{(T-14)}$$

When the determination made in sub-step S5413 is negative, it means that the estimated stress value S lies in one of the regions (D-417) of the graph of FIG. 11, and the processing unit 11 proceeds to sub-step S5417 (see FIG. 20) to further determine whether the relation among the first, second and third preliminary stress values $S_{w\lambda_1}$, $S_{w\lambda_2}$, $S_{w\lambda_3}$ satisfies $$\frac{S_{w\lambda_1} + S_{w\lambda_2}}{-S_{w\lambda_2} + S_{w\lambda_3}} = \frac{\lambda_1 - \lambda_2}{\lambda_2 - \lambda_3}$$

in order to further locate the estimated stress value S. The flow goes to sub-step S5418 when the determination made in sub-step S5417 is affirmative, and goes to sub-step S5419 when otherwise.

In sub-step S5418, the processing unit 11 makes the fifteenth system of candidate equations (T-15) the system of stress equations to be used in step S6.

$$S=2i_1(A\lambda_1+B)-S_{w\lambda_1}$$

$$S=2i_1(A\lambda_2+B)+S_{w\lambda_2}$$

$$S=2i_1(A\lambda_3+B)+S_{w\lambda_3} \quad \text{(T-15)}$$

In sub-step S5419, the processing unit 11 makes the sixteenth system of candidate equations (T-16) the system of stress equations to be used in step S6.

$$S=2i_1(A\lambda_1+B)+S_{w\lambda_1}$$

$$S=2i_1(A\lambda_2+B)+S_{w\lambda_2}$$

$$S=2i_1(A\lambda_3+B)+S'_{w\lambda_3} \quad \text{(T-16)}$$

With sub-steps S510-S5419 described above with reference to FIGS. 12-20, the processing unit 11 can determine one of the systems of candidate equations to be the system of stress equations used in step S6. Since a number of the unknown parameters (i.e., two) is less than a number of the stress equations (i.e., three), the system of stress equations determined in step S5 can be used to calculate the estimated stress value S. For example, the method of least squares can be used in linear regression to calculate the estimated stress value S and the fringe order $i_1$. In practice, since the fringe order $i_1$ should be a positive integer, the fringe order $i_1$ can be calculated by rounding off to a nearest integer, and then the processing unit 11 substitutes the fringe order $i_1$ to the system of stress equations to calculate the estimated stress value S. As a result, the accuracy of the estimated stress value S is enhanced.

In sum, the method for analyzing stress in the object 3 according to this disclosure can be used to obtain the estimated stress value S without the limited condition of choosing the proper wavelengths of the light used in photoelasticity. Furthermore, instead of using complicated computing algorithms such as iterative method and/or converting the wrapped phase values, the processing unit 11 simply selects one of the first to sixteenth systems of candidate equations (T-1) to (T-16) that can be stored in advance, and calculates the estimated stress value S by directly using the selected one of the systems of candidate equations (T-1) to (T-16).

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. A method for analyzing stress in an object according to spectrum data, the spectrum data being obtained from an interference fringe pattern (IFP) of the object that results from performing photoelasticity, the method comprising the steps of:
    a) analyzing the spectrum data to obtain three sets of intensity data that are related respectively to different wavelengths of light used in photoelasticity;
    b) calculating three wrapped phases according to the three sets of intensity data, respectively;
    c) calculating three preliminary stress values according to the wrapped phases, respectively, wherein each of the preliminary stress values is directly proportional to a product of a corresponding one of the wrapped phases and a linear function of a corresponding one of the wavelengths;
    d) determining a system of stress equations according to a relation among the preliminary stress values; and
    e) calculating an estimated stress value based on the preliminary stress values using the system of stress equations determined in step d).

2. The method of claim 1, wherein, in step b) each of the wrapped phases is calculated by substituting a corresponding one of the sets of intensity data into one of the inverse sine function, the inverse cosine function and the inverse tangent function.

3. The method of claim 1, wherein, in step c), the preliminary stress values are calculated based on $$S_w = \frac{A\lambda + B}{\pi}\delta_w,$$

where $S_w$ denotes the preliminary stress values, $\lambda$ denotes a corresponding one of the wavelengths, A and B are known parameters related to characteristics of material of the object, and $\delta_w$ denotes a corresponding one of the wrapped phases.

4. The method of claim 3, wherein step d) includes the sub-steps of:
    d10) determining whether the relation among the preliminary stress values satisfies $S_{w\lambda_1}=S_{w\lambda_2}=S_{w\lambda_3}$, where $S_{w\lambda_1}$ denotes a first preliminary stress value of the preliminary stress values that corresponding a first wavelength $\lambda_1$ of the wavelengths, $S_{w\lambda_2}$ denotes a second preliminary stress value of the preliminary stress values that corresponding a second wavelength $\lambda_2$ of the wavelengths, $S_{w\lambda_3}$ denotes a third preliminary stress value of the preliminary stress values that corresponding a third wavelength $\lambda_3$ of the wavelengths, and $\lambda_1>\lambda_2>\lambda_3$; and
    d11) when the determination made in sub-step d10) is affirmative, making the following system of candidate equations the system of stress equations $$S=2i_1(A\lambda_1+B)+S_{w\lambda_1}$$

$$S=2i_1(A\lambda_2+B)+S_{w\lambda_2},$$

$$S=2i_1(A\lambda_3+B)+S_{w\lambda_3}$$

where S denotes the estimated stress value, and $i_1$ denotes a rounding integer part of a fringe order of the IFP corresponding to the first wavelength $\lambda_1$.

5. The method of claim 3, wherein step d) includes the following sub-steps of:
   d20) determining whether the relation among the preliminary stress values satisfies $S_{w\lambda_1}=S_{w\lambda_2}\neq S_{w\lambda_3}$, where $S_{w\lambda_1}$ denotes a first preliminary stress value of the preliminary stress values that corresponding a first wavelength $\lambda_1$ of the wavelengths, $S_{w\lambda_2}$ denotes a second preliminary stress value of the preliminary stress values that corresponding a second wavelength $\lambda_2$ of the wavelengths, $S_{w\lambda_3}$ denotes a third preliminary stress value of the preliminary stress values that corresponding a third wavelength $\lambda_3$ of the wavelengths, and $\lambda_1>\lambda_2>\lambda_3$;
   d21) when the determination made in sub-step d20) is affirmative, determining whether the relation between the second and third preliminary stress values $S_{w\lambda_2}$, $S_{w\lambda_3}$ satisfies $S_{w\lambda_2}>S_{w\lambda_3}$; and
   d22) when the determination made in sub-step d21) is negative, making the following system of candidate equations the system of stress equations $$S=2i_1(A\lambda_1+B)-S_{w\lambda_1}$$
$$S=2i_1(A\lambda_2+B)-S''_{w\lambda_2},$$
$$S=2i_1(A\lambda_3+B)-S''_{w\lambda_3}$$

where S denotes the estimated stress value, and $i_1$ denotes a rounding integer part of a fringe order of the IFP corresponding to the first wavelength $\lambda_1$.

6. The method of claim 5, wherein step d) further includes the sub-steps of:
   d23) when the determination made in sub-step d21) is affirmative, determining whether the relation between the second and third preliminary stress values $S_{w\lambda_2}$, $S_{w\lambda_3}$ satisfies $S_{w\lambda_2}=S'_{w\lambda_3}=2(A\lambda_3+B)-S_{w\lambda_3}$; and
   d24) when the determination made in sub-step d23) is affirmative, making the following system of candidate equations the system of stress equations $$S=2i_1(A\lambda_1+B)+S_{w\lambda_1}$$
$$S=2i_1(A\lambda_2+B)+S_{w\lambda_2}$$
$$S=2i_1(A\lambda_3+B)+S'_{w\lambda_3}.$$

7. The method of claim 6, wherein step d) further includes the sub-step of:
   d25) when the determination made in sub-step d23) is negative, making the following system of candidate equations the system of stress equations $$S=2i_1(A\lambda_1+B)+S_{w\lambda_1}$$
$$S=2i_1(A\lambda_2+B)+S'_{w\lambda_2},$$
$$S=2i_1(A\lambda_3+B)+S'_{w\lambda_3}$$

where $S'_{w\lambda_2}=2(A\lambda_2+B)-S_{w\lambda_2}$.

8. The method of claim 3, wherein step d) includes the following sub-steps of:
   d30) determining whether the preliminary stress values satisfies $S_{w\lambda_1}\neq S_{w\lambda_2}=S_{w\lambda_3}$, where $S_{w\lambda_1}$ denotes a first preliminary stress value of the preliminary stress values that corresponding a first wavelength $\lambda_1$ of the wavelengths, $S_{w\lambda_2}$ denotes a second preliminary stress value of the preliminary stress values that corresponding a second wavelength $\lambda_2$ of the wavelengths, $S_{w\lambda_3}$ denotes a third preliminary stress value of the preliminary stress values that corresponding a third wavelength $\lambda_3$ of the wavelengths, and $\lambda_1>\lambda_2>\lambda_3$;
   d31) when the determination made in sub-step d30) is affirmative, determining whether the relation between the first and second preliminary stress values $S_{w\lambda_1}$, $S_{w\lambda_2}$ satisfies $S_{w\lambda_1}>S_{w\lambda_2}$; and
   d32) when the determination made in sub-step d31) is affirmative, making the following system of candidate equations the system of stress equations $$S=2i_1(A\lambda_1+B)-S_{w\lambda_1}$$
$$S=2i_1(A\lambda_2+B)-S_{w\lambda_2},$$
$$S=2i_1(A\lambda_3+B)+S_{w\lambda_3}$$

where S denotes the estimated stress value, and $i_1$ denotes a rounding integer part of a fringe order of the IFP corresponding to the first wavelength $\lambda_1$.

9. The method of claim 8, wherein step d) further includes the sub-step of:
   d33) when the determination made in sub-step d31) is negative, making the following system of candidate equations the system of stress equations $$S=2i_1(A\lambda_1+B)+S_{w\lambda_1}$$
$$S=2i_1(A\lambda_2+B)+S_{w\lambda_2},$$
$$S=2i_1(A\lambda_3+B)+S'_{w\lambda_3}$$

where $S'_{w\lambda_3}=2(A\lambda_3+B)-S_{w\lambda_3}$.

10. The method of claim 3, wherein step d) includes the sub-steps of:
   d400) determining whether the relation among the preliminary stress values satisfies $$S_{w\lambda_1}\neq S_{w\lambda_2}$$
$$S_{w\lambda_2}\neq S_{w\lambda_3},$$
$$S_{w\lambda_3}\neq S_{w\lambda_1}$$

where $S_{w\lambda_1}$ denotes a first preliminary stress value of the preliminary stress values that corresponding a first wavelength $\lambda_1$ of the wavelengths, $S_{w\lambda_2}$ denotes a second preliminary stress value of the preliminary stress values that corresponding a second wavelength $\lambda_2$ of the wavelengths, $S_{w\lambda_3}$ denotes a third preliminary stress value of the preliminary stress values that corresponding a third wavelength $\lambda_3$ of the wavelengths, and $\lambda_1>\lambda_2>\lambda_3$;
   d401) when the determination made in sub-step d400) is affirmative, determining whether the relation among the first, second and third preliminary stress values $S_{w\lambda_1}$, $S_{w\lambda_2}$, $S_{w\lambda_3}$ satisfies $$\frac{S_{w\lambda_1}-S_{w\lambda_2}}{S_{w\lambda_2}-S_{w\lambda_3}}=\frac{\lambda_1-\lambda_2}{\lambda_2-\lambda_3};$$

d402) when the determination made in sub-step d401) is affirmative, determining whether the relation among the first and second preliminary stress values $S_{w\lambda_1}$, $S_{w\lambda_2}$ satisfies $S_{w\lambda_1}>S_{w\lambda_2}$; and
   d403) when the determination made in sub-step d402) is affirmative, making the following system of candidate equations the system of stress equations $$S=2i_1(A\lambda_1+B)-S_{w\lambda_1}$$

$$S = 2i_1(A\lambda_2 + B) - S_{w\lambda_2},$$

$$S = 2i_1(A\lambda_3 + B) - S_{w\lambda_3}$$

where S denotes the estimated stress value, and $i_1$ denotes a rounding integer part of a fringe order of the IFP corresponding to the first wavelength $\lambda_1$.

11. The method of claim 10, wherein step d) further includes the sub-step of:
   d404) when the determination made in sub-step d402) is negative, making the following system of candidate equations the system of stress equations $$S = 2i_1(A\lambda_1 + B) + S_{w\lambda_1}$$

$$S = 2i_1(A\lambda_2 + B) + S_{w\lambda_2}$$

$$S = 2i_1(A\lambda_3 + B) + S_{w\lambda_3}.$$

12. The method of claim 10, wherein step d) further includes the sub-steps of:
   d405) when the determination made in sub-step d401) is negative, determining whether the relation between the first and second preliminary stress values $S_{w\lambda_1}$, $S_{w\lambda_2}$ satisfies $S_{w\lambda_1} > S_{w\lambda_2}$;
   d406) when the determination made in sub-step d405) is affirmative, determining whether the relation between the second and third preliminary stress values $S_{w\lambda_2}$, $S_{w\lambda_3}$ satisfies $S_{w\lambda_2} > S_{w\lambda_3}$;
   d407) when the determination made in sub-step d406) is affirmative, determining whether the relation among the first, second and third preliminary stress values $S_{w\lambda_1}$, $S_{w\lambda_2}$, $S_{w\lambda_3}$ satisfies $$\frac{S_{w\lambda_1} - S'_{w\lambda_2}}{S'_{w\lambda_2} - S'_{w\lambda_3}} = \frac{\lambda_1 - \lambda_2}{\lambda_2 - \lambda_3},$$

where
$S'_{w\lambda_2} = 2(A\lambda_2 + B) - S_{w\lambda_2}$, and $S'_{w\lambda_3} = 2(A\lambda_3 + B) - S_{w\lambda_3}$; and
   d408) when the determination made in sub-step d407) is affirmative, making the following system of candidate equations the system of stress equations $$S = 2i_1(A\lambda_1 + B) + S_{w\lambda_1}$$

$$S = 2i_1(A\lambda_2 + B) + S'_{w\lambda_2}$$

$$S = 2i_1(A\lambda_3 + B) + S'_{w\lambda_3}.$$

13. The method of claim 12, wherein step d) further includes the sub-step of:
   d409) when the determination made in sub-step d407) is negative, making the following system of candidate equations the system of stress equations $$S = 2i_1(A\lambda_1 + B) - S_{w\lambda_1}$$

$$S = 2i_1(A\lambda_2 + B) - S_{w\lambda_2}$$

$$S = 2i_1(A\lambda_3 + B) + S_{w\lambda_3}.$$

14. The method of claim 12, wherein step d) further includes the sub-steps of:
   d410) when the determination made in sub-step d406) is negative, determining whether the relation among the first, second and third preliminary stress values $S_{w\lambda_1}$, $S_{w\lambda_2}$, $S_{w\lambda_3}$ satisfies $$\frac{S_{w\lambda_1} - S_{w\lambda_2}}{S_{w\lambda_2} + S_{w\lambda_3}} = \frac{\lambda_1 - \lambda_2}{\lambda_2 - \lambda_3};$$

and
   d411) when the determination made in sub-step d410) is affirmative, making the following system of candidate equations the system of stress equations $$S = 2i_1(A\lambda_1 + B) - S_{w\lambda_1}$$

$$S = 2i_1(A\lambda_2 + B) - S_{w\lambda_2}$$

$$S = 2i_1(A\lambda_3 + B) + S_{w\lambda_3}.$$

15. The method of claim 14, wherein step d) further includes the sub-step of:
   d412) when the determination made in sub-step d410) is negative, making the following system of candidate equations the system of stress equations $$S = 2i_1(A\lambda_1 + B) - S_{w\lambda_1}$$

$$S = 2i_1(A\lambda_2 + B) + S_{w\lambda_2}$$

$$S = 2i_1(A\lambda_3 + B) + S_{w\lambda_3}.$$

16. The method of claim 12, wherein step d) further includes the sub-steps of:
   d413), when the determination made in sub-step d405) is negative, determining whether the relation among the second and third preliminary stress values $S_{w\lambda_2}$, $S_{w\lambda_3}$ satisfies $S_{w\lambda_2} > S_{w\lambda_3}$;
   d414) when the determination made in sub-step d413) is affirmative, determining whether the relation among the first, second and third preliminary stress values $S_{w\lambda_1}$, $S_{w\lambda_2}$, $S_{w\lambda_3}$ satisfies $$\frac{S_{w\lambda_1} - S_{w\lambda_2}}{S_{w\lambda_2} - S'_{w\lambda_3}} = \frac{\lambda_1 - \lambda_2}{\lambda_2 - \lambda_3};$$

and
   d415) when the determination made in sub-step d414) is affirmative, making the following system of candidate equations the system of stress equations $$S = 2i_1(A\lambda_1 + B) + S_{w\lambda_1}$$

$$S = 2i_1(A\lambda_2 + B) + S_{w\lambda_2}$$

$$S = 2i_1(A\lambda_3 + B) + S'_{w\lambda_3}.$$

17. The method of claim 16, wherein step d) further includes the sub-step of:
   d416) when the determination made in sub-step d414) is negative, making the following system of candidate equations the system of stress equations $$S = 2i_1(A\lambda_1 + B) + S_{w\lambda_1}$$

$$S = 2i_1(A\lambda_2 + B) + S'_{w\lambda_2}$$

$$S = 2i_1(A\lambda_3 + B) + S'_{w\lambda_3}.$$

18. The method of claim 16, wherein step d) further includes the sub-steps of:
   d417) when the determination made in sub-step d413) is negative, determining whether the relation among the first, second and third preliminary stress values $S_{w\lambda_1}$, $S_{w\lambda_2}$, $S_{w\lambda_3}$ satisfies $$\frac{S_{w\lambda_1} + S_{w\lambda_2}}{-S_{w\lambda_2} + S_{w\lambda_3}} = \frac{\lambda_1 - \lambda_2}{\lambda_2 - \lambda_3};$$

and d418) when the determination made in sub-step d417) is affirmative, making the following system of candidate equations the system of stress equations $S=2i_1(A\lambda_1+B)-S_{w\lambda_1}$ $S=2i_1(A\lambda_2+B)+S_{w\lambda_2}$ $S=2i_1(A\lambda_3+B)+S_{w\lambda_3}$.

19. The method of claim 18, wherein step d) further includes the sub-step of:

d419) when the determination made in sub-step d417) is negative, making the following system of candidate equations the system of stress equations $S=2i_1(A\lambda_1+B)+S_{w\lambda_1}$ $S=2i_1(A\lambda_2+B)+S_{w\lambda_2}$ $S=2i_1(A\lambda_3+B)+S'_{w\lambda_3}$.

20. The method of claim 1, further comprising, between steps c) and d), the steps of normalizing the preliminary stress values, and filtering out high-frequency noise from the preliminary stress values.

21. The method of claim 1, further comprising, after step e), the step of smoothing the estimated stress value.

22. The method of claim 1, wherein, in the step e), the estimated stress value is calculated by fitting the system of stress equations us ing the least square method.

* * * * *